(12) United States Patent
Chen et al.

(10) Patent No.: US 11,532,077 B2
(45) Date of Patent: Dec. 20, 2022

(54) TECHNIQUES FOR COMPUTING PERCEPTUAL VIDEO QUALITY BASED ON BRIGHTNESS AND COLOR COMPONENTS

(71) Applicant: NETFLIX, INC., Los Gatos, CA (US)

(72) Inventors: Li-Heng Chen, Austin, TX (US); Christos G. Bampis, Los Gatos, CA (US); Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 18 days.

(21) Appl. No.: 16/995,680

(22) Filed: Aug. 17, 2020

(65) Prior Publication Data

US 2022/0051383 A1 Feb. 17, 2022

(51) Int. Cl.
*G06K 9/00* (2022.01)
*G06T 7/00* (2017.01)
*G06T 7/90* (2017.01)
*H04N 21/234* (2011.01)

(52) U.S. Cl.
CPC .............. *G06T 7/0002* (2013.01); *G06T 7/90* (2017.01); *G06T 2207/10016* (2013.01); *G06T 2207/10024* (2013.01); *G06T 2207/20081* (2013.01); *G06T 2207/30168* (2013.01); *H04N 21/23418* (2013.01)

(58) Field of Classification Search
CPC ..................... G06T 7/0002; G06T 7/90; G06T 2207/10016; G06T 2207/10024; G06T 2207/20081; G06T 2207/30168; H04N 21/23418
USPC ......................................................... 382/100
See application file for complete search history.

(56) References Cited

U.S. PATENT DOCUMENTS

| | | | |
|---|---|---|---|
| 7,683,931 B2 | 3/2010 | Pirzada et al. | |
| 8,456,531 B2 | 6/2013 | Winkler | |
| 2008/0298469 A1 | 12/2008 | Liu et al. | |
| 2009/0213272 A1 | 8/2009 | Suzuki | |
| 2011/0007968 A1 | 1/2011 | Yamada | |
| 2011/0102601 A1 | 5/2011 | Davis | |

(Continued)

FOREIGN PATENT DOCUMENTS

WO 2020/043279 A1 3/2020

OTHER PUBLICATIONS

Oszust, Mariusz. "No-reference image quality assessment with local features and high-order derivatives." Journal of Visual Communication and Image Representation 56 (2018): 15-26. (Year: 2018).*

(Continued)

*Primary Examiner* — Jonathan S Lee
(74) *Attorney, Agent, or Firm* — Artegis Law Group, LLP

(57) ABSTRACT

In various embodiments, a quality inference application estimates the perceived quality of reconstructed videos. The quality inference application computes a first feature value for a first feature included in a feature vector based on a color component associated with a reconstructed video. The quality inference application also computes a second feature value for a second feature included in the feature vector based on a brightness component associated with the reconstructed video. Subsequently, the quality inference application computes a perceptual quality score based on the first feature value and the second feature value. The perceptual quality score indicates a level of visual quality associated with at least one frame included in the reconstructed video.

20 Claims, 4 Drawing Sheets

(56) References Cited

U.S. PATENT DOCUMENTS

| | | |
|---|---|---|
| 2014/0160139 A1 | 6/2014 | MacInnis et al. |
| 2014/0301460 A1 | 10/2014 | Karczewicz et al. |
| 2015/0130952 A1 | 5/2015 | Wang et al. |
| 2015/0341667 A1 | 11/2015 | Liao et al. |
| 2017/0154415 A1 | 6/2017 | Aydin et al. |
| 2018/0068195 A1 | 3/2018 | Kolarov et al. |
| 2018/0084280 A1 | 3/2018 | Thiagarajan et al. |
| 2019/0020875 A1 | 1/2019 | Liu et al. |
| 2019/0379895 A1 | 12/2019 | Katsavounidis et al. |
| 2020/0021865 A1 | 1/2020 | Topiwala et al. |
| 2020/0067629 A1 | 2/2020 | Xiong et al. |
| 2020/0145661 A1 | 5/2020 | Jeon et al. |
| 2020/0304792 A1 | 9/2020 | Zaghetto et al. |
| 2020/0372682 A1 | 11/2020 | Kim et al. |
| 2021/0150672 A1 | 5/2021 | Xu |
| 2021/0282640 A1 | 9/2021 | Song et al. |
| 2021/0287361 A1 | 9/2021 | Shriram et al. |
| 2021/0344930 A1 | 11/2021 | Wang et al. |
| 2021/0409725 A1 | 12/2021 | Pedzisz |

OTHER PUBLICATIONS

Chen, Li-Heng, et al. "Perceptual video quality prediction emphasizing chroma distortions." IEEE Transactions on Image Processing 30 (2020): 1408-1422. (Year: 2020).*

Göring, Steve, Janto Skowronek, and Alexander Raake. "DeViQ—A deep no reference video quality model." Electronic Imaging 2018. 14 (2018): 1-6. (Year: 2018).*

Göring, Steve, Rakesh Rao Ramachandra Rao, and Alexander Raake. "nofu—A lightweight no-reference pixel based video quality model for gaming content." 2019 Eleventh International Conference on Quality of Multimedia Experience (QoMEX). IEEE, 2019. (Year: 2019).*

Nieto, Roger Gomez, et al. "No reference video quality assessment with authentic distortions using 3-D deep convolutional neural network." Electronic Imaging 2020.9 (2020): 168-1. (Year: 2020).*

Shang, Xiwu, et al. "Color-sensitivity-based combined PSNR for objective video quality assessment." IEEE Transactions on Circuits and Systems for Video Technology 29.5 (2018): 1239-1250. (Year: 2018).*

Subramanyam, Shishir, et al. "User centered adaptive streaming of dynamic point clouds with low complexity tiling." Proceedings of the 28th ACM International Conference on Multimedia. 2020. (Year: 2020).*

Zvezdakova, Anastasia, et al. "Hacking VMAF with video colorand contrast distortion." arXiv preprint arXiv: 1907.04807 (2019). (Year: 2019).*

Cisco, "Cisco visual networking index: Forecast and methodology, 2017-2022", White paper Cisco public, 2017, 38 pages.

Li et al., "Toward a Practical Perceptual Video Quality Metric", The Netflix Technology Blog, Jun. 6, 2016, pp. 1-22.

Li et al., "VMAF: The Journey Continues", The Netflix Tech Blog, Oct. 26, 2018, pp. 1-12.

Wang et al., "Image quality assessment: From error visibility to structural similarity", IEEE Transactions on Image Processing, vol. 13, No. 4, Apr. 2004, pp. 600-612.

Bjontegaard, Gisle, "Calculation of average PSNR differences between RD-curves", Document VCEG-M33, ITU-T Video Coding Experts Group (VCEG) Thirteenth Meeting, Apr. 2-4, 2001, pp. 1-4.

Seshadrinathan et al., "Study of subjective and objective quality assessment of video", IEEE Transactions on Image Processing, vol. 19, No. 6, Jun. 2010, pp. 1427-1441.

Moorthy et al., "Video quality assessment on mobile devices: Subjective, behavioral and objective studies", IEEE Journal of Selected Topics in Signal Processing, vol. 6, No. 6, Oct. 6, 2012, pp. 652-671.

Vu et al., "ViS3: an algorithm for video quality assessment via analysis of spatial and spatiotemporal slices", Journal Electronic Imaging, vol. 23, No. 1, Feb. 2014, 25 pages.

Li et al., "Joint Collaborative Team on Video Coding (JCT-VC) of ITU-T SG16 WP3 and ISO/IEC JTC1/SC29/WG11", SHVC verification test results, JCTVC-H0069, 8th Meeting, Feb. 1-10, 2012, pp. 1-11.

VQEG, "Video Quality Experts Group", HDTV Phase I, retrieved on Aug. 24, 2021, 2 pages.

Winkler, Stefan, "Analysis of Public Image and Video Databases for Quality Assessment", IEEE Journal of Selected Topics in Signal Processing, vol. 6, No. 6, Oct. 2012, pp. 616-625.

Winkler, Stefan, "Image and Video Quality Resources", URL: http://stefan.winkler.net/resources.html, 2012, pp. 1-9.

Cheon et al., "Subjective and objective quality assessment of compressed 4k UHD videos for immersive experience", Transactions on Circuits and Systems for Video Technology, vol. 28, No. 7, Jul. 2018, pp. 1467-1480.

Zhang et al., "BVI-HD: A Video Quality Database for HEVC Compressed and Texture Synthesized Content", IEEE Transactions on Multimedia, vol. 20, No. 10, Oct. 2018, pp. 2620-2630.

Ghadiyaram et al., "A Subjective and Objective Study of Stalling Events in Mobile Streaming Videos", IEEE Transactions on Circuits and Systems for Video Technology, vol. 29, No. 1, Jan. 2019, pp. 1-14.

Rao et al., "AVTVQDB-UHD-1: A Large Scale Video Quality Database for UHD-1", Proc. IEEE Int. Symp. Multimedia, Dec. 2019, 8 pages.

Shang et al., "Color-Sensitivity-based combined PSNR for objective video quality assessment", IEEE Transactions on Circuits Systems Video Technology, vol. 29, No. 5, May 2019, pp. 1-12.

Ponomarenko et al., "Image database TID2013: Peculiarities, results and perspectives", Signal Processing: Image Communication, vol. 30, Jan. 2015, pp. 57-77.

Sinno et al., "Quality measurement of images on mobile streaming interfaces deployed at scale", IEEE Transaction Image Processing, vol. 29, 2020, pp. 2536-2551.

Wang et al., "Video quality assessment based on structural distortion measurement", Signal Processing Image Communication, vol. 19, No. 2, Feb. 2004, pp. 121-132.

Wang et al., "Multi-scale structural similarity for image quality assessment", In Proc., IEEE Asilomar Conf. on Signals, Syst., and Comput., Nov. 2003, pp. 1398-1402.

Sheikh et al., "Image information and visual quality", IEEE Transactions on Image Processing, vol. 15, No. 2, Feb. 2006, pp. 430-444.

Seshadrinathan et al., "Motion tuned spatio-temporal quality assessment of natural videos", IEEE Transactions on Image Processing, vol. 19, No. 2, Feb. 2010, pp. 335-350.

Vu et al., "A Spatiotemporal most-apparent-distortion model for video quality assessment", IEEE International Conference Image Processing, Sep. 2011, pp. 2505-2508.

Pinson et al., "A new standardized method for objectively measuring video quality", IEEE Transaction on Broadcasting, vol. 50, No. 3, Sep. 2004, pp. 312-322.

Wolf, Stephen, Variable frame delay (VFD) parameters for video quality measurements, U.S. Dept. Commer., Nat. Telecommun. Inf. Admin., Boulder, CO, Technical Memorandum, Apr. 2011, 49 pages.

Pinson et al., "Temporal video quality model accounting for variable frame delay distortions", IEEE Transaction on Broadcasting, vol. 60, No. 4, Dec. 2014, pp. 637-649.

Hekstra et al., "PVQM—a perceptual video quality measure", Signal Process. Image Commun., vol. 17, No. 10, Nov. 2002, pp. 781-798.

Tao et al., "Video quality assesment using m-SVD", in Proc. SPIE, vol. 6494, Jan. 2007, 10 pages.

Soundararajan et al., "Video quality assessment by reduced reference spatio-temporal entropic differencing," IEEE Trans. Circuits Syst. Video Technol., vol. 23, No. 4, Apr. 2013, pp. 684-694.

Bampis et al., "SpEEDQA: Spatial efficient entropic differencing for image and video quality", IEEE Signal Process. Letter, vol. 24, No. 9, Sep. 2017, pp. 1333-1337.

Manasa et al., "An optical flow-based full reference video quality assessment algorithm", IEEE Trans. Image Process., vol. 25, No. 6, Jun. 2016, pp. 2480-2492.

(56) References Cited

OTHER PUBLICATIONS

Hu et al., "Objective video quality assessment based on perceptually weighted mean squared error", IEEE Trans. Circuits Syst. Video Technol., vol. 27, No. 9, Sep. 2017, pp. 1844-1855.
Yu et al., "Predicting the quality of images compressed after distortion in two steps", IEEE Trans. Image Processing, vol. 28, No. 12, Dec. 2019, pp. 5757-5770.
Sullivan et al., "Objective Quality Metric and Alternative Methods for Measuring Coding Efficiency", Document JCTVC-H0012, ITU-T/ISO/IEC Joint Collaborative Team Video Coding (JCT-VC), Feb. 1-10, 2012, pp. 1-95.
Ponomarenko et al., "On between-coefficient contrast masking of DCT basis functions", 3rd Int. Workshop Video Process. Quality Metrics Consum. Electron., Jan. 2007, 4 pages.
Valin et al., "Daala: Building a next-generation video codec from unconventional technology", in Proc. IEEE Int. Workshop Multimedia Signal Process. (MMSP), Sep. 2016, pp. 157-162.
Ghadiyaram et al., "A subjective and objective study of stalling events in mobile streaming videos", IEEE Trans. Circuits Syst. Video Technology, vol. 29, No. 1, Jan. 2019, pp. 183-197.
Buczkowski et al., "Comparison of effective coverage calculation methods for image quality assessment databases", Intl. Journal Elect. Telecomm., vol. 64, No. 3, Aug. 2018, pp. 307-313.
Chen et al., "Study of 3d virtual reality picture quality", IEEE J. Select. Topics Signal Processing, vol. 14, No. 1, Jan. 2020. pp. 89-102.
Hasler et al., "Measuring colorfulness in natural images", in Proc. SPIE Human Vision and Electronic Imaging, vol. 5007, Jun. 2003, pp. 87-95.
Bampis et al., "Spatiotemporal feature integration and model fusion for full reference video quality assessment", IEEE Trans. Circuits Syst. Video Technol., vol. 29, No. 8, Sep. 2018, pp. 2256-2270.
"Methodology for the Subjective Assessment of the Quality of Television Pictures", Document ITU-R Rec.BT.500-11, International Telecommunication Union, 2002, pp. 1-48.
Peirce, Jonathan W., "PsychoPy—Psychophysics software in Python", Journal of Neurosci. Methodscience, vol. 162, May 2007, pp. 8-13.
"Methodology for the Subjective Assessment of the Quality of Television Pictures", Document ITU-R Rec.BT.500-13, International Telecommunication Union, 2012, 46 pages.
Li et al., "Image quality assessment by separately evaluating detail losses and additive impairments", IEEE Trans. Multimedia, vol. 13, No. 5, Oct. 2011, pp. 935-949.
Mullen, Kathy T., "The contrast sensitivity of human colour vision to redgreen and blue-yellow chromatic gratings", J. Physiol., vol. 359, 1985, pp. 381-400.
Sekiguchi et al., "Efficiency in detection of isoluminant and isochromatic interference fringes", J. Opt. Soc. Am. A, vol. 10, No. 10, Oct. 1993, pp. 2118-2133.
Rovamo et al., "Modelling spatial contrast sensitivity functions for chromatic and luminance-modulated gratings", Vision Research, vol. 39, No. 14, Jun. 1999, pp. 2387-2398.
Tu et al., "BBAND index: A no-reference banding artifact predictor", arXiv preprint arXiv:2002.11891, 2020, pp. 2712-2716.
Simone et al., "A h.264/AVC video database for the evaluation of quality metrics", Proc. IEEE Int. Conf. Acoust. Speech Signal Process., Mar. 2010, pp. 2430-2433.
ITU-T, "Subjective video quality assessment methods for multimedia applications", Int. Telecom., Series P: Telephone Transmission Quality, Telephone Installations, Local Line Networks, 1999, 37 pages.
Corey et al., "Averaging correlations: Expected values and bias in combined Pearson rs and Fisher's z transformations", J. Gen. Psychol., vol. 125, No. 3, Jul. 1998, pp. 245-261.
Chang et al., "LIBSVM: A library for support vector machines", ACM Trans. Intell. Syst. Technol., vol. 2, No. 3, Apr. 2011, 27 pages.
Scholkopf et al., "New support vector algorithms", Neural Comput., vol. 12, No. 5, May 2000, pp. 1207-1245.
Tu et al., "A comparative evaluation of temporal pooling methods for blind video quality assessment", Feb. 25, 2020, 5 pages.
Liu et al., "Deep video frame interpolation using cyclic frame generation", In Proc. AAAI, 2019, pp. 8794-8802.
Li et al., "Image quality assessment by separately evaluating detail losses and additive impairments", IEEE Transactions on Multimedia, vol. 13, No. 5, Oct. 2011, pp. 935-949.
Wu et al., "Digital Image Video Quality and Perceptual Coding", Boca Raton, Nov. 2005, 615 pages.
Mavlankar et al. "AVIF for Next-Generation Image Coding", The Netflix Tech Blog, Feb. 14, 2020, 45 pages.
Shang et al., "Color-Sensitivity-Based Combined PSNR for Objective Video Quality Assessment", IEEE Transactions on Circuits Systems For Video Technology, vol. 29, No. 5, May 2019, pp. 1-12.
Aaron et al., "Per-Title Encode Optimization", The Netflix Tech Blog, 2015, available at https://netflixtechblog.com/per-title-encode-optimization-7e99442b62a2, Dec. 14, 2015, 13 pages.
Katsavounidis et al., "Dynamic optimizer—a perceptual video encoding optimization framework", The Netflix Tech Blog, Mar. 5, 2018, 22 pages.
Wikipedia, "Chrominance", URL: https://en.wikipedia.org/wiki/Chrominance, retrieved on Aug. 25, 2021, pp. 1-3.
International Search Report for application No. PCT/US2021/045762 dated Nov. 26, 2021.
Non Final Office Action received for U.S. Appl. No. 16/995,677 dated May 25, 2022, 38 pages.
Notice of Allowance received for U.S. Appl. No. 16/995,677 dated Sep. 16, 2022, 6 pages.

\* cited by examiner

TECHNIQUES FOR COMPUTING PERCEPTUAL VIDEO QUALITY BASED ON BRIGHTNESS AND COLOR COMPONENTS

BACKGROUND

Field of the Various Embodiments

The various embodiments relate generally to computer science and to video and video encoding technology and, more specifically, to techniques for computing perceptual video quality based on brightness and color components.

Description of the Related Art

Efficiently and accurately encoding video data is critical for real-time delivery of high-quality videos. Typically, after an encoded video is transmitted to a playback device, the encoded video data is decoded to generate a reconstructed video that is played back via the playback device. To increase the degree of compression in order to reduce the size of encoded videos, encoders typically leverage lossy data compression techniques that eliminate selected information. In general, eliminating information during encoding can lead to visual quality impairments or "distortions" that can reduce the visual quality of the reconstructed videos derived from encoded videos.

Because the number and types of distortions introduced when encoding videos varies, quality controls are typically implemented to ensure that the visual quality of reconstructed videos as perceived by actual viewers ("perceptual video quality") is acceptable. However, manually verifying the perceptual video quality of reconstructed videos is prohibitively time consuming. Therefore, some form of automated perceptual video quality assessment is oftentimes integrated into the video encoding and delivery process. For example, automated perceptual video quality assessment could be employed when determining which encoded version of a given video should be transmitted to a playback device to provide an optimized level of video quality during playback while avoiding playback interruptions due to re-buffering.

In one approach to automatically assessing perceptual video quality, a software application computes a feature value vector for a feature vector based on a reconstructed video and an associated original video. Each feature included in the feature vector quantifies at least one quality-related aspect of the reconstructed video. The software application then maps the feature value vector to a perceptual quality score using a perceptual quality model, where the perceptual quality model has been trained based on human-assigned quality scores associated with a set of different reconstructed training videos. Each human-assigned quality score reflects the video quality of a given reconstructed training video as perceived by a human viewer when viewing the reconstructed training video.

One drawback of the above approach is that conventional perceptual quality models typically disregard color distortions when computing perceptual video quality. In this regard, the features associated with conventional perceptual quality models are usually computed based on the brightness component, but not the color components, of the reconstructed videos. As a result, conventional perceptual quality models can end up mapping two reconstructed videos having the same brightness distortions, but different color distortions, to the same perceptual quality score even when the actual perceptual video quality levels, as perceived by actual human viewers, differ.

In addition, because conventional perceptual quality models typically disregard color distortions, perceptual quality models are not reliable in assessing the impact of color component compression on the perceptual video quality levels of reconstructed videos. Thus, if a conventional perceptual quality model is used to set the degrees of brightness compression and color compression by an encoder, then the number of bits used for encoding to achieve a target perceptual video quality level can be unnecessarily high. For example, tests have shown that, when the degree of brightness compression is relatively low, and the degree of color compression is then set to achieve a target perceptual video quality level, the total number of bits used to encode a given video can be reduced by over a third relative to the number of bits used to encode that same video when a conventional perceptual quality model is used to set the degrees of compression.

As the foregoing illustrates, what is needed in the art are techniques that more effectively capture the perceptual effects of color distortions on the actual subjective quality of reconstructed videos as perceived by human viewers.

SUMMARY

One embodiment sets forth a method for computer-implemented method for estimating the perceived quality of reconstructed videos. The method includes computing a first feature value for a first feature included in a feature vector based on a first color component associated with a first reconstructed video; computing a second feature value for a second feature included in the feature vector based on a first brightness component associated with the first reconstructed video; and computing a first perceptual quality score based on the first feature value and the second feature value, where the first perceptual quality score indicates a level of visual quality associated with at least one frame included in the first reconstructed video.

At least one technical advantage of the disclosed techniques relative to the prior art is that the disclosed techniques can be used to more accurately estimate perceptual video quality levels for reconstructed videos having both brightness distortions and color distortions. In that regard, with the disclosed techniques, a perceptual quality model learns to map a feature value vector for a feature vector that captures visual quality-related aspects of both color distortions as well as brightness distortions to a perceptual video quality level. Accordingly, the trained perceptual quality model is able to account for the composite impact of various combinations of color distortions and brightness distortions on visual quality, as perceived by actual human viewers of reconstructed videos. Thus, the trained perceptual quality model can be used to more accurately set both the degree of brightness compression and the degrees of color compression implemented by an encoder to achieve a target perceptual video quality level. As a result, the number of bits used to encode given videos can be reduced relative to prior art techniques. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
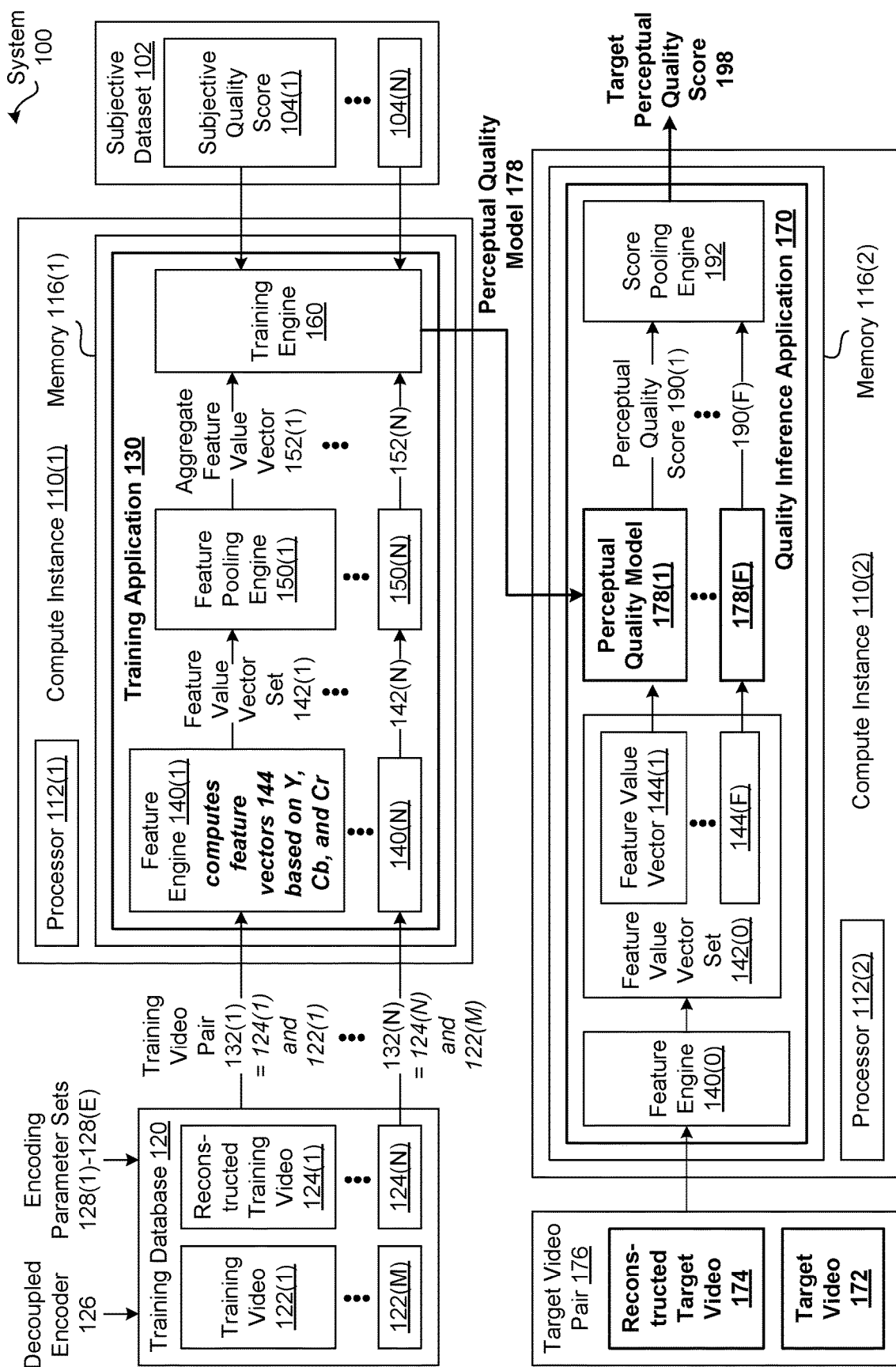
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A typical video streaming service provides access to a library of videos that can be viewed on a range of different playback devices, where each playback device usually connects to the video streaming service under different connection and network conditions. To efficiently deliver videos to playback devices, the video streaming service provider encodes the videos and then streams the resulting encoded videos to the playback devices. Each playback device decodes the stream of encoded video data and displays the resulting reconstructed video to viewers. To reduce the size of encoded videos, encoders typically leverage lossy data compression techniques that eliminate selected information. In general, eliminating information during encoding can lead to visual quality impairments or "distortions" that can reduce the visual quality of the reconstructed videos derived from encoded videos.

Because the number and types of distortions introduced when encoding videos varies, video streaming services typically implement quality controls to ensure that the visual quality of reconstructed videos as perceived by actual viewers ("perceptual video quality") is acceptable. In practice, because manually assessing the perceptual video quality of reconstructed videos can be prohibitive time consuming, some video streaming services integrate conventional perceptual quality models that estimate the perceptual video quality of reconstructed videos into the video encoding and delivery process. For example, some video streaming services use conventional perceptual quality models to set degree(s) of compression when encoding a video to ensure a target perceptual video quality level during playback of the associated reconstructed video content.

One drawback of using conventional perceptual quality models to estimate the perceptual video quality of reconstructed videos is that conventional perceptual quality models typically disregard color distortions when computing perceptual video quality. As a result, conventional perceptual quality models can end up mapping two reconstructed videos having the same brightness distortions, but different color distortions, to the same perceptual quality score even when the actual perceptual video quality levels, as perceived by actual human viewers, differ. Thus, when conventional perceptual quality models are used to set the degree of color compression by an encoder, the number of bits used for encoding to achieve a target perceptual video quality level can be unnecessarily high.

With the disclosed techniques, however, a training application trains a perceptual quality model to account for the composite impact of brightness distortions and color distortions when estimating perceptual quality. In some embodiments the training application trains the perceptual quality model based on a feature vector that captures aspects of color distortions as well as aspects of brightness distortions. As persons skilled in the art will recognize, videos and reconstructed videos can be represented via a luma ("Y") component, a blue-difference ("Cb") component, and a red-difference ("Cr") component. In some embodiments, the feature vector includes, without limitation, at least one feature that is computed based on the Y component, at least one feature that is computed based on the Cb component, and at least one feature that is computed based on the Cr component.

For each of any number of reconstructed training videos, the training application computes a feature value vector for the feature vector based on the Y, Cb, and Cr components of the reconstructed training video. Some of the reconstructed training videos include distortions resulting from similar degrees of color compression and brightness compression, while the remainder of the reconstructed training videos include distortions resulting from degrees of color compression that differ from the degree of brightness compression. Each of the reconstructed training videos is associated with a subjective quality score that reflects individual quality scores assigned by human viewers while viewing the reconstructed training video. The training application performs any number and/or types of machine learning operations on an untrained machine learning model based on the feature value vectors and the subjective quality scores to generate the perceptual quality mode. In general, the perceptual quality model maps a feature value vector computed based on any portion of a reconstructed video to a perceptual quality score for the portion of the reconstructed video.

In some embodiments, a quality inference application subsequently uses the perceptual quality model to compute a perceptual quality score for a reconstructed target video. The quality inference application computes a different feature value vector for each frame of the reconstructed target video based on the Y, Cb, and Cr components of the reconstructed target video. For each frame of the reconstructed target video, the quality inference application inputs the associated feature value vector into the perceptual quality model and, in response, the perceptual quality model outputs the perceptual quality score for the frame. Based on the perceptual quality scores for the frames of the reconstructed target video, the quality inference application computes a target perceptual quality score that estimates the overall perceptual video quality of the reconstructed target video.

At least one technical advantage of the disclosed techniques relative to the prior art is that the quality inference application can more accurately estimate perceptual video quality levels for reconstructed videos having both brightness distortions and color distortions. In that regard, the feature value vector sets for the reconstructed training videos capture visual quality-related aspects of diverse ranges and combinations of color distortions as well as brightness distortions. Consequently, the perceptual quality model learns to properly account for the composite impact of color distortions and brightness distortions when computing the perceived visual quality of reconstructed videos.

Notably, relative to prior art techniques, the perceptual quality model can be used to reduce the number of bits used by an encoder to achieve a target perceptual video quality level. For example, tests have shown that, when the degree of brightness compression is relatively low, and the perceptual quality model is used to set the degree of color compression to achieve a target perceptual video quality level, the total number of bits used to encode a given video can be reduced by over a third relative to the number of bits used to encode that same video when a conventional perceptual quality model is used to set the degrees of compression. These technical advantages provide one or more technological improvements over prior art approaches.

System Overview

FIG. 1 is a conceptual illustration of a system 100 configured to implement one or more aspects of the various embodiments. For explanatory purposes, multiple instances of like objects are denoted with reference numbers identifying the object and parenthetical alphanumeric character(s) and/or numerical superscripts identifying the instance where needed. As shown, in some embodiments, the system 100 includes, without limitation, a compute instance 110(1), a compute instance 110(2), a training database 120, a decoupled encoder 126, encoding parameter sets 128(1)-128(E) (where E can be any positive integer), a subjective dataset 102, and a target video pair 176.

In some alternate embodiments, the system 100 can omit the decoupled encoder 126 and/or the encoding parameter sets 128(1)-128(E). In the same or other alternate embodiments, the system 100 can include, without limitation, any number of compute instances 110, any number of training databases 120, and any number of subjective datasets 102 in any combination. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). The compute instances 110(1) and 110(2) are also referred to herein individually as "the compute instance 110" and collectively as "the compute instances 110." The processors 112(1) and 112(2) are also referred to herein individually as "the processor 112" and collectively as "the processors 112." The memories 116(1) and 116(2) are also referred to herein individually as "the memory 116" and collectively as "the memories 116." Each of the compute instances 110 can be implemented in a cloud computing environment, implemented as part of any other distributed computing environment, or implemented in a stand-alone fashion.

The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. The memory 116 can be one or more of a readily available memory, such as random-access memory, read only memory, floppy disk, hard disk, or any other form of digital storage, local or remote.

In some alternate embodiments, each of any number of compute instances 110 may include any number of processors 112 and any number of memories 116 in any combination. In particular, any number of the compute instances 110 (including one) may provide a multiprocessing environment in any technically feasible fashion.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing In general, each of the compute instances 110 is configured to implement one or more software applications. For explanatory purposes only, each software application is described as residing in the memory 116 of a single compute instance 110 and executing on a processor 112 of the single compute instance 110. However, in some embodiments, the functionality of each software application can be distributed across any number of other software applications that reside in the memories 116 of any number of compute instances 110 and execute on the processors 112 of any number of compute instances 110 in any combination. Further, the functionality of any number of software applications can be consolidated into a single software application.

In particular, in some embodiments, a quality inference application 170 resides in the memory 116(2) of the compute instance 110(2) and executes on the processor 112(2) of the compute instance 110(2) during an inference phase. As shown, the quality inference application 170 computes a target perceptual quality score 198 based on a target video pair 176. The target video pair 176 includes, without limitation, the reconstructed target video 174 and the target video 172 from which the reconstructed target video 174 was derived. The target perceptual quality score 198 estimates the overall perceptual video quality of the reconstructed target video 174. The target perceptual quality score 198 is also referred to here as the "overall perceptual quality score" of the reconstructed target video 174.

The target video 172 can include, without limitation, any amount and/or types of video content. Some examples of video content include, without limitation, any portion (including all) of feature length films, episodes of television programs, and music videos, to name a few. The reconstructed target video 174 includes, without limitation, reconstructed video content that is derived from the target video 172. The reconstructed target video 174 can be derived from the target video 172 in any technically feasible fashion. In some embodiments, the target video 172 is encoded to generate an encoded target video (not shown) and then the encoded target video is decoded to generate the reconstructed target video 174. In this fashion, the reconstructed target video 174 approximates the video content included in the target video 172 as conveyed to a viewer via an encoding and streaming infrastructure and a playback device.

As persons skilled in the art will recognize, any type of video content (including reconstructed video content) can be represented in a YCbCr color space. In a YCbCr color space, video content is represented via a Y component, a Cb component, and a Cr component. The Y component represents the brightness information of the video content and is also referred to herein as the "brightness component." The Cb and the Cr components represent the color information of the video content and are also referred to herein as the "color components" and the "chroma components." More precisely, the Cb component is the blue-difference chroma component that represents the difference between blue and the Y component. The Cr component is the red-difference chroma component that represents the difference between red and the Y component.

To increase compression rates and/or reduce the size of encoded videos, encoders typically leverage lossy data compression techniques that eliminate selected information in the Y, Cb, and Cr components. Compression of the Y component is also referred to herein as "Y compression" and "brightness compression." Compression of the Cb component is also referred to herein as "Cb compression," and compression of the Cr component is also referred to herein as "Cr compression." Collectively and individually, Cb compression and Cr compression are also referred to herein as "color compression."

In general, eliminating information when encoding video content leads to distortions in subsequently derived reconstructed video content. More precisely, eliminating information in the Y component, the Cb component, and the Cr component of video content leads to distortions in the Y component, the Cb component, and the Cr component, respectively, of the reconstructed video content. The distortions in the Y component are also referred to herein as the "Y distortions" or the "brightness distortions." The distortions in the Cb components and Cr components are referred to as the "Cb distortions" and the "Cr distortions," respectively. Individually and collectively, the Cb distortions and Cr distortions are also referred to herein as the "color distortions."

The target perceptual quality score 198 is an estimated value of a perceptual quality metric for the reconstructed target video 174. In general, a value of the perceptual quality metric for reconstructed video content quantifies the visual quality as perceived by an average viewer of the reconstructed video content during playback of the reconstructed video content. The visual quality of reconstructed content as perceived by an average viewer of the reconstructed video content during playback of the reconstructed video content is also referred to here as the "perceptual video quality" of the reconstructed video content. The target perceptual quality score 198 therefore estimates the perceptual video quality of the reconstructed target video 174. In some embodiments, the target perceptual quality score 198 can be a value for any type of visual quality metric or video quality metric for the reconstructed target video 174 instead of a value of a perceptual quality metric.

As described previously herein, in some conventional systems, software applications assess the perceptual video quality of reconstructed videos using conventional perceptual quality models that are associated with features computed based on the brightness component, but not the color components, of the reconstructed videos. As a result, conventional perceptual quality models usually disregard the impact of color distortions on actual perceptual quality levels. In particular, conventional perceptual quality models can end up mapping two reconstructed videos having the same brightness distortions, but different color distortions, to the same perceptual quality score even when the actual perceptual video quality levels, as perceived by actual human viewers, differ. Consequently, algorithms associated with encoding and/or video streaming that use conventional perceptual quality models to assess tradeoffs between bitrate and perceptual video quality can use unnecessarily high numbers of bits for encoding and/or streaming to achieve a given perceptual video quality level.

Estimating Perceptual Video Quality Based on Brightness and Color

To address the above problems, the system 100 includes, without limitation, a training application 130 that trains an untrained machine learning model (not shown) to account for the composite impact of brightness distortions and color distortions when estimating the perceptual video quality of reconstructed video content. In some embodiments, the training application 130 resides in the memory 116(1) of the compute instance 110(1) and executes on the processor 112(1) of the compute instance 110(1) during a training phase.

During the training phase, the training application 130 trains the untrained machine learning model based on the training database 120 and the subjective dataset 102. After the training phase is complete, the trained machine learning model is also referred to herein as a perceptual quality model 178. Subsequently, in some embodiments, the quality inference application 170 uses the perceptual quality model 178 to compute the target perceptual quality score 198 for the reconstructed target video 174.

As shown, the training database 120 includes, without limitation, training videos 122(1)-122(M) and reconstructed training videos 124(1)-124(N), where M and N can be any positive integers and M is not greater than N. The training videos 122(1)-122(M) are also referred to herein individually as "the training video 122" and collectively as "the training videos 122." The reconstructed training videos 124(1)-124(N) are also referred to herein individually as "the reconstructed training video 124" and collectively as "the reconstructed training videos 124."

Each of the training videos 122 includes, without limitation, any amount and/or types of video content. In some embodiments, each of the training videos 122 includes a relatively small amount of video content, such as an eight to ten second clip of a feature length film, an episode of a television program, or a music video. As persons skilled in the art will recognize, the range of video content represented by the training videos 122 typically correlates to the robustness of the perceptual quality model 178 with respect to video content.

In some embodiments, to increase the robustness of the perceptual quality model 178, the training videos 122 represent diverse ranges and combinations of high level video characteristics and low level video characteristics. Some examples of high level characteristics include, without limitation, animation, sports, indoor, camera motion, face close-up, people, water, obvious salience, and object number. Some examples of low level characteristics include, without limitation, film grain noise, brightness, contrast, texture, motion, color variance, color richness, and sharpness.

Each of the reconstructed training videos 124 includes, without limitation, reconstructed video content that is derived from the video content included in one of the training videos 122. The reconstructed training videos 124 can be derived from the training videos 122 in any technically feasible fashion. For instance, in some embodiments, each of the training videos 122 is independently encoded based on encoding parameter sets 128(1)-128(E) (where E can be any positive integer) to generate multiple encoded training videos (not shown). The encoding parameter sets 128(1)-128(E) are also referred to herein individually as "the encoding parameter set 128" and collectively as "the encoding parameter sets 128."

Each of the encoding parameter sets 128 specifies, without limitation, values for any number of encoding parameters, where each encoding parameter controls how an encoder compresses video content to generate encoded video content. In some embodiments, the encoding parameter sets 128 control how the encoder compresses the Y component, the Cb component, and the Cr component of the video content to generate the Y component, the Cb component, and the Cr component, respectively, of the encoded video content.

In some other embodiments, each of the encoding parameter sets 128 can specify any amount and/or types of values that are relevant to generating the reconstructed training videos 124 in addition to or instead of the values for encoding parameters. For instance, in some embodiments, each of the encoding parameter sets 128 specifies, without limitation, a resolution at which the video content is encoded, a resolution for the reconstructed video content, and values for any number of encoding parameters.

The encoded training videos are decoded to generate the reconstructed training videos 124. As shown, the reconstructed training videos 124(1)-124(M) are associated with training video pairs 132(1)-132(M), respectively. For the reconstructed training video 124(x), for x is an integer between 1 and M, the training video pair 132(x) includes, without limitation, the reconstructed training video 124(x) and the training video 122 associated with the reconstructed training video 124(x). As referred to herein, the training video 122 associated with the reconstructed training videos 124(x) is the training video 122 from which the reconstructed training video 124(x) was derived via encoding and decoding operations. For explanatory purposes only, and as denoted in italics, the training video pair 132(1) includes, without limitation, the reconstructed training video 124(1) and the training video 122(1), and the training video pair 132(N) includes, without limitation, the reconstructed training video 124(N) and the training video 122(M).

Because the training application 130 trains the untrained machine learning model based on the training database 120, the robustness of the perceptual quality model 178 with respect to distortions typically correlates to the breadth of types and combinations of distortions represented by the reconstructed training videos 124. In some embodiments, to increase the robustness of the perceptual quality model 178 with respect to distortions, the encoding parameter sets 128 specify different combinations of multiple degrees of brightness compression, multiple degrees of Cb compression, and multiple degrees of Cr compression.

In some embodiments, the encoding parameter sets 128 are designed to increase the effectiveness with which algorithms associated with encoding and/or video streaming can optimize tradeoffs between bitrate and perceptual visual quality during encoding and/or video streaming. Some examples of algorithms that are associated with encoding and/or video streaming include, without limitation, video compression algorithms, shot-based encoding algorithms, video rate algorithms, and encoder evaluation algorithms.

For instance, human viewers are more sensitive to loss of detail attributable to brightness compression than to loss of color attributable to color compression. Accordingly, in some embodiments, the encoding parameter sets 128 provide a range of degrees of brightness compression that result in a range of visually distinguishable levels of degradation in the brightness component across the reconstructed training videos 124.

As persons skilled in the art will recognize, in many conventional encoders, the degrees of Cb compression and Cr compression are tightly coupled to the degree of Y compression. As a result, reconstructed content is often generated using similar degrees of Y, Cb, and Cr compression. In some embodiments, to ensure the accuracy of the perceptual quality model 178 for reconstructed video content generated via conventional encoders, each of a subset of the encoding parameter sets 128 specifies degrees of color compression that are similar to the degree of brightness compression.

Importantly, empirical results have shown that human viewers typically do not observe color distortions in reconstructed video content unless the degree of brightness compression associated with the reconstructed video content is relatively low. To properly quantify the impact of color distortions on human viewers, in some embodiments, a subset of the encoding parameter sets 128 provide different combinations of relatively low degrees of brightness compression and diverse degrees of color compression.

To generate the encoded training videos, each of the training videos 122 is multiply encoded based on the encoding parameter sets 128 using the decoupled encoder 126. The decoupled encoder 126 can be any type of encoder that can implement arbitrary combinations of degrees of brightness compression and color compression. In some embodiments, the decoupled encoder 126 is a version of a conventional encoder that is modified to decouple the degrees of Cb compression and Cr compression from the degree of Y compression.

For instance, in some embodiments, the decoupled encoder 126 is a modified version of a conventional encoder (not shown) that implements the High Efficiency Video Coding ("HEVC") standard. In the conventional HEVC encoder, the degrees of Y, Cb, and Cr compression correlate to values for Y, Cb, and Cr quantization parameters ("QPs"), respectively. The Y QP is also referred to herein as "the brightness QP." The Cb QP and the Cr QP are also referred to herein individually as "the color QP" and collectively as "the color QPs." The Y QP, the Cb QP, and the Cr QP are denoted herein as $QP_Y$, $QP_{Cb}$, $QP_{Cr}$, respectively and are collectively referred to as "the QPs." The values for the QPs can vary between 0 and 51. Typically, as the value for a quantization parameter increases, the degree of compression in the associated component also increases.

In the conventional HEVC encoder, the value for $QP_Y$ can be directly assigned and the values for $QP_{Cb}$ and $QP_{Cr}$ are determined, at least in part, based on the value for $QP_Y$. More precisely, the conventional HEVC encoder automatically computes the value for $QP_{Cb}$ based on $QP_Y$ and a Cb offset parameter that is denoted herein as $\Delta QP_{Cb}$. And the conventional HEVC encoder automatically computes the value for $QP_{Cr}$ based on $QP_Y$ and a Cr offset parameter that is denoted herein as $\Delta QP_{Cr}$. For example, the conventional HEVC encoder could compute $QP_{Cb}$ and $QP_{Cr}$ via equations (1a) and (1b), respectively:

$$QP_{Cb} \approx f(QP_Y + \text{clip}_{[-12,12]} \Delta QP_{Cb}) \qquad (1a)$$

$$QP_{Cr} \approx f(QP_Y + \text{clip}_{[-12,12]} \Delta QP_{Cr}) \qquad (1b)$$

In equations (1a) and (1b), f is a nonlinear mapping function that is typically implemented as a fixed look-up table and $\text{clip}_{[-12,12]}$ that limits the range of each of $\Delta QP_{Cb}$ and $\Delta QP_{Cr}$ to −12 to 12.

In some embodiments, the conventional HEVC encoder is modified to remove the clipping function from equations (1a) and (1b) to generate the decoupled encoder 126. The decoupled encoder 126 is then used to encode each of the training videos 122 based on the encoding parameter sets 128 that each include, without limitation, values for $QP_Y$, $\Delta QP_{Cb}$, and $\Delta QP_{Cr}$, where the values for $\Delta QP_{Cb}$, and $\Delta QP_{Cr}$ can vary from −51 to 51. The decoupled encoder 126 also clips $QP_{Cb}$ and $QP_{Cr}$ to the range of 0 to 51.

In some embodiments, within any number of the encoding parameter sets 128, the values for $\Delta QP_{Cb}$, and $\Delta QP_{Cr}$ can differ and within the remainder (if any) of the encoding parameter sets 128, the values for $\Delta QP_{Cb}$, and $\Delta QP_{Cr}$ can match. In the same or other embodiments, each of the encoding parameter sets 128 can include any number and/or type of encoding parameters instead of or in addition to any number of $QP_Y$, $QP_{Cb}$, and $QP_{Cr}$. In the same or other alternate embodiments, each of the training videos 122 can be encoded based on a different subset of the encoding parameter sets 128.

As shown, in some embodiments, the training application 130 includes, without limitation, feature engines 140(1)-140(N), feature pooling engines 150(1)-150(N), and a training engine 160. Each of the feature engines 140(1)-140(N) is a different instance of a single software application, referred to herein as the feature engine 140. Instances of the feature engine 140 (e.g., the feature engines 140(1)-140(N)) are also referred to herein individually as the feature engine 140. Each of the feature pooling engines 150(1)-150(N) is a different instance of a single software application, referred to herein as the feature pooling engine 150. The feature pooling engines 150(1)-150(N) are also referred to herein individually as the feature pooling engine 150.

As shown, in some embodiments, the training application 130 inputs the training video pairs 132(1)-132(N) into the feature engines 140(1)-140(N), respectively. In response, the feature engines 140(1)-140(N) compute and output feature value vector sets 142(1)-142(N), respectively. The feature value vector set 142(x), for an integer x from 1 to N, includes, without limitation, a feature value vector 144 for each frame of the reconstructed training video 124(x). For example, if the feature value vector set 142(N) were to include 8640 frames, then the feature value vector set 142(N) would include, without limitation, 8640 of the feature value vectors 144.

Each of the feature value vectors 144 includes, without limitation, a different value for each feature included in a feature vector (not shown). A value for a feature is also referred to herein as a "feature value." Each feature is a quantifiable measure that can be used to assess at least one aspect of visual quality associated with reconstructed video content. The feature vector can include, without limitation, any number and/or types of features in any combination.

In some embodiments, the feature vector includes, without limitation, any number of spatial features and any number (including none) of temporal features. Each spatial feature quantifies any number of aspects of any number of types of spatial artifacts in one or more of the Y, Cb, and Cr components of reconstructed video content. A spatial artifact is a location-based distortion and is also referred to herein as a "spatial distortion." Some examples of spatial artifacts include, without limitation, blurring, blocking, ringing, staircase noise, and color bleeding. Each type of spatial artifact can be associated with any number of the Y, Cb, and Cr components. For example, color bleeding occurs when the edges of one color in the image unintentionally bleeds or overlaps into another color and is therefore associated with both the Cb component and the Cr component.

Each temporal feature quantifies any number of aspects of any number of types of temporal artifacts that are associated with sequences of frames of the reconstructed video content. A temporal artifact is a time-based or sequence-based distortion and is also referred to herein as a "temporal distortion." Each type of temporal artifact can be associated with any number of the Y, Cb, and Cr components. Some examples of temporal artifacts include, without limitation, flickering, floating, and ghosting.

The features included in the feature vector can be determined in any technically feasible fashion based on any number and/or types of criteria. In some embodiments, the features included in the feature vector are empirically selected to provide valuable insight into the visual quality across the range of the reconstructed training videos 124. In the same or other embodiments, the features included in the feature vector are empirically selected to provide insight into the impacts of any number and/or types of artifacts on perceptual video quality. For example, the selected features can provide insight into, without limitation, blocking, staircase noise, color bleeding, and flickering on perceptual visual quality.

In the same or other embodiments, the feature vector includes, without limitation, a temporal feature and any number of objective image quality metrics. As is well known, each objective image quality metric exhibits both strengths and weaknesses. To leverage the strengths and mitigate the weaknesses, the feature vector includes, without limitation, multiple objective image quality metrics having complementary strengths.

The feature engine 140(x), where x is an integer from 1 to N, can compute feature values for a given feature based on any number of the components of the training video pair 132(x) in any combination and in any technically feasible fashion. For instance, in some embodiments, the feature vector includes, without limitation, any number of Y spatial features, any number of Y temporal features, any number of Cb spatial features, and any number of Cr spatial features.

In some embodiments, the feature engine 140(x) computes feature values for each Y spatial feature and each Y temporal feature based on the Y components of the training video pair 132(x). The feature engine 140(x) computes feature values for each Cb spatial feature based on the Cb components of the training video pair 132(x). The feature engine 140(x) computes feature values for each Cr spatial feature based on the Cr components of the training video pair 132(x). Features that the feature engine 140(x) computes based on Y components are also referred to herein as "brightness features." Features that the feature engine 140(x) computes based on Cb and/or Cr features are also referred to herein as "color features."

As described in greater detail below in conjunction with FIG. 2, for each feature, the feature engine 140 can compute the associated feature values based on the associated component(s) in any technically feasible fashion. In some embodiments, the feature engine 140 uses one or more image quality assessment algorithms typically associated with Y spatial features to compute features values for any number of Y, Cb, and Cr spatial features. For instance, in some embodiments, the feature engine 140 applies an Additive Distortion Metric ("ADM") image quality assessment algorithm separately to each of the Y components, the Cb components, and the Cr components of the training video pair 132(x) to compute feature values for a Y spatial feature, a Cb spatial feature, and a Cr spatial feature, respectively.

As shown, in some embodiments, the feature engine 140($x$) computes the feature value vector 144 for each frame of the reconstructed training video 124($x$). In some other embodiments, the feature engine 140($x$) can compute the feature value vector 144 at any level of granularity, and the techniques described herein are modified accordingly. For instance, in some embodiment, the feature engine 140($x$) computes a single feature value vector 144 for the reconstructed training video 124($x$), irrespective of the total number of frames included in the reconstructed training video 124($x$)

For explanatory purposes only, the functionality of the feature engine 140 is described above in the context of the feature engine 140($x$) that receives the input of the training video pair 132($x$). As described previously herein, the training video pair 132($x$) includes, without limitation, the reconstructed training video 124($x$) and the training video 122($x$). It is to be understood that the input to any instance of the feature engine 140 can be any video pair that includes, without limitation, a reconstructed video and an associated video. In response, the feature engine 140 computes and outputs the feature value vector set 142 associated with the reconstructed video as described above.

In some embodiments, the training application 130 includes less than N instances of the feature engine 140, and the training application 130 inputs the training video pairs 132(1)-132(N) into any number of instances of the feature engine 140 sequentially, concurrently, or in any combination thereof. For instance, in some alternate embodiments, the training application 130 sequentially inputs the training video pairs 132(1)-132(N) into a single instance of the feature engine 140. In response, the single instance of the feature engine 140 sequentially outputs the feature value vector sets 142(1)-142(N).

As shown, in some embodiments, the training application 130 inputs the feature value vector sets 142(1)-142(N) into the feature pooling engines 150(1)-150(N), respectively. In response, the feature pooling engines 150(1)-150(N) generate and output aggregate feature value vectors 152(1)-152(N), respectively. Each of the aggregate feature value vectors 152(1)-152(N) is a different set of feature values for the feature vector. In some embodiments, the aggregate feature value vector 152($x$), where x is an integer between 1 and N, is a set of feature values for the reconstructed video content across the frames of the reconstructed training video 124($x$).

The feature pooling engine 150($x$) can compute the aggregate feature value vector 152($x$) biased on the feature value vector 144($x$) in any technically feasible fashion. In some embodiments, for each of the features included in the feature vector, the feature pooling engine 150($x$) sets the associated feature value in the aggregate feature value vector 152($x$) equal to the arithmetic mean of the associated feature values in the feature value vectors 144 included in the feature value vector set 142($x$). For example, the feature pooling engine 150($x$) sets the first feature value in the aggregate feature value vector 152($x$) equal to the average of the first feature values in the feature value vectors 144 included in the feature value vector set 142($x$). In this fashion, each of the feature values in the aggregate feature value vector 152($x$) represents an average feature value for the associated feature across the frames included in the reconstructed training video 124($x$).

In some embodiments, the training application 130 includes less than N instances of the feature pooling engine 150, and the training application 130 inputs the feature value vector sets 142(1)-142(N) into any number of instances of the feature pooling engine 150 sequentially, concurrently, or in any combination thereof. For instance, in some alternate embodiments, the training application 130 sequentially inputs the feature value vector sets 142(1)-142(N into a single instance of the feature pooling engine 150. In response, the single instance of the feature pooling engine 150 sequentially outputs the aggregate feature value vector 152(1)-152(N).

As shown, in some embodiments, the training engine 160 generates the perceptual quality model 178 based on the aggregate feature value vectors 152(1)-152(N) and the subjective dataset 102. The subjective dataset 102 includes, without limitation, subjective quality scores 104(1)-104(N) that are associated with the reconstructed training videos 124(1)-124(N), respectively. Importantly, for x is an integer from 1 to N, the reconstructed training video 124($x$) is associated with both the aggregate feature value vector 152($x$) and the subjective quality score 104($x$).

The subjective quality scores 104(1)-104(N) are generated based on human-assigned individual quality scores (not shown) specifying visual quality levels of the reconstructed training videos 124(1)-124(N), respectively. The subjective quality scores 104(1)-104(N) are also referred to herein individually as "the subjective quality score 104" and collectively as "the subjective quality scores 104." The individual quality scores and the subjective quality scores 104 can be determined in any technically feasible fashion.

In some embodiments, the individual quality scores are assigned by human participants in a subjective quality experiment. During the subjective quality experiment, participants watch as the reconstructed training videos 124 are played back on playback devices and assign individual quality scores that rate the visual quality of the reconstructed training videos 124. The participants can assess and rate the visual quality of the reconstructed training videos based on any type of rating system.

For instance, in some embodiments, the subjective quality experiment implements absolute category rating techniques in which each of the participants watches each of the reconstructed training videos 124 and assigns the individual quality scores based on absolute ratings along any type of consistent visual quality scale. For example, the consistent visual quality scale could range from 1 (visual quality is bad) to 5 (visual quality is excellent). Accordingly, each individual quality score is an individual video quality assessment of the associated reconstructed training video 124.

In some other embodiments, the subjective quality experiment implements degradation category rating techniques. During the subjective quality experiment, for each of the training video pairs 132, each of the participants watches the training video 122 and the reconstructed training video 124 and then assigns the individual quality score based on the impairments perceived in the reconstructed training video 124. The participants can assign the impairment rating based on any type of consistent visual impairment scale. For example, the consistent visual impairment scale could range from 1 (impairments are very annoying) to 5 (impairments are imperceptible).

The subjective quality scores 104 can be generated based on the individual quality scores in any technically feasible fashion. In some embodiments, for each of the reconstructed training videos 124, the subjective quality score 104 is set equal to the average or "mean opinion score" of the associated individual quality scores. In other embodiments, the subjective quality scores 104 are generated based on any type of subjective data model that takes into account the individual quality scores.

The training engine 160 can apply any number and/or types of machine learning algorithms to the aggregate feature value vectors 152(1)-152(N) and the subjective quality scores 104(1)-104(N) to generate the perceptual quality model 178. Some examples of machine learning algorithms include, without limitation, Support Vector Regression algorithms, tree-based regression algorithms, tree-based ensemble methods (e.g., Random Forest, Gradient Boosting), etc. The aggregate feature value vectors 152(1)-152(N) and the subjective quality scores 104(1)-104(N) are also referred to herein collectively as "the training data."

Applying machine learning algorithm(s) to training data is also referred to herein as "training an untrained machine learning model" based on the training data. As a general matter, the training engine 160 can perform any number and/or types of machine learning operations and/or training operations on the untrained machine learning model based on any amount and/or types of training data to generate the perceptual quality model 178. The untrained machine learning model can be any type of machine learning model or any type of composite machine learning model that can include, without limitation, any number of different types of machine learning models in any combination.

In some embodiments, for each of the reconstructed training videos 124(x), where x is an integer from 1 to N, the training engine 160 trains the untrained machine learning model based on the association between the aggregate feature value vector 152(x) and the subjective quality score 104(x). In some other embodiments, the training engine 160 can train the untrained machine learning model based on training data at any other levels of granularity. For instance, in some embodiments, the training engine 160 trains the untrained machine learning model based on the feature value vector 144 computed at the granularity of a frame and a per-frame subjective quality score for each frame of each of the reconstructed training videos 124.

In some embodiments, the training engine 160 implements one or more regularization techniques to increase the accuracy of the perceptual quality model 178 for reconstructed video content that includes certain types of distortions that are not effectively represented in the training database 120. For instance, in some embodiments, the training engine 160 uses a uniform quantization function to regularize the color feature(s) to increase the accuracy of the perpetual quality model 178 for reconstructed video content that include transient distortions. An example of a uniform quantization function with a parameterized quantization step size $\Delta_N=1/N$ that maps a real value $x \in (0,1]$ to N discrete values is given by equation (2):

$$\tilde{x} = Q_N(X) = \left\lceil \frac{x}{\Delta N} \right\rceil \qquad (2)$$

As persons skilled in the art will recognize, for a feature regulated via equation (2), as the value of N increases, the contribution of the feature to the training of the untrained machine learning model increases.

After the training engine 160 finishes training the untrained machine learning model based on the training data, the trained machine learning model is also referred to herein as the "perceptual quality model 178." Irrespectively of the level of granularity at which the training engine 160 trains the untrained machine learning model, the perceptual quality model 178 maps a set of features values for a set of features that are computed at any given granularity to the perceptual quality score 190 at the same granularity. The perceptual quality score 190 is a value of the perceptual quality metric that quantifies perceptual video quality and is instituted by the perceptual quality model 178.

Advantageously, the perceptual quality model 178 is able to account for the composite impact of various combinations of color distortions and brightness distortions on visual quality, as perceived by actual human viewers of reconstructed videos. In that regard, the feature value vector sets 140(1)-140(N) capture visual quality-related aspects of both color distortions as well as brightness distortions. Consequently, relative to prior-art techniques, the training application 130 can train the perceptual quality model 178 to more accurately estimate perceptual video quality levels for reconstructed videos having both brightness distortions and color distortions.

In some embodiments, the training engine 160 transmits the perceptual quality model 178 to the quality inference application 170 and/or any number of other software applications. In the same or other embodiments, the training engine 160 stores the perceptual quality model 178 in any number and/or types of memory instead of or in addition to transmitting the perceptual quality model 178 to any number of software applications.

In some embodiments, during the inference phase, the quality inference application 170 computes the target perceptual quality score 198 based on the target video pair 176. As noted previously herein, the target video pair 176 includes, without limitation, the reconstructed target video 174 and the target video 172 from which the reconstructed target video 174 was derived. The target perceptual quality score 198 is a value for the perceptual quality metric implemented by the perceptual quality model 178 that estimates the perceptual video quality of the reconstructed target video 174. In some embodiments, the quality inference application 170 can compute any number of target perceptual quality scores 198 for each of any number of reconstructed target videos 174 based on the reconstructed target video 174 and the target video 172 form which the reconstructed target video 174 was derived.

In some embodiments, the quality inference application 170 includes, without limitation, the feature engine 140(0), the perceptual quality models 178(1)-178(F), and a score pooling engine 192. For explanatory purposes only, F is the total number of frames included in the reconstructed target video 174 and can be any positive integer. The feature engine 140(0) is an instance of the feature engine 140 described previously herein in conjunction with the training application 130. The feature engine 140(0) is also referred to herein as the feature engine 140.

As shown, the quality inference application 170 inputs the target video pair 176 into the feature engine 140(0) and, in response, the feature engine 140(0) computes and outputs the feature value vector set 142(0). The feature value vector set 142(0) includes the feature value vectors 144(1)-144(F). Each of the feature value vectors 144(1)-144(F) includes, without limitation, a different set of feature values for the feature vector. More specifically, the feature value vectors 144(1)-144(F) include, without limitation, sets of feature values for the $1^{st}$-$F^{th}$ frames, respectively, of the reconstructed target video 174.

As described previously herein with respect to the training video pairs 132, the feature engine 140(0) can compute the feature values for each of the features included in the feature vector based on any number of the components of the target video pair 176 in any combination and in any technically feasible fashion. The feature engine 140(0) is described in greater detail below in conjunction with FIG. 2.

In some embodiments, the quality inference application 170 inputs the feature value vectors 144(1)-144(F) into the perceptual quality models 178(1)-178(F). In response, the perceptual quality models 178(1)-178(F) compute and output the perceptual quality scores 190(1)-190(F), respectful. Each of the perceptual quality models 178(1)-178(F) is a different instance of the perceptual quality model 178 generated by the training application 130. The perceptual quality models 178(1)-178(F) are also referred to herein individually as the perceptual quality model 178. Each of the perceptual quality scores 190(1)-190(F) is a different value for the perceptual quality metric instituted by the perceptual quality model 178. In some embodiments, the perceptual quality scores 190(1)-190(F) estimate the perceptual video quality of the $1^{st}$-$F^{th}$ frames, respectively, of the reconstructed target video 174.

In some embodiments, the quality inference application 170 includes less than F instances of the perceptual quality model 178, and the quality inference application 170 inputs the feature value vectors 144(1)-144(F)) into any number of instances of the perceptual quality model 178 sequentially, concurrently, or in any combination thereof. For instance, in some alternate embodiments, the quality inference application 170 sequentially inputs the feature value vectors 144(1)-144(F) into a single instance of the perceptual quality model 178. In response, the single instance of the perceptual quality model 178 sequentially outputs the perceptual quality scores 190(1)-190(F).

As shown, in some embodiments, the quality inference application 170 inputs the perceptual quality scores 190(1)-190(F) into the score pooling engine 192. In response, the score pooling engine 192 generates and outputs the target perceptual quality score 198. The score pooling engine 192 can compute the target perceptual quality score 198 based on the perceptual quality scores 190(1)-190(F) in any technically feasible fashion.

In some embodiments, the score pooling engine 192 performs any number and/or types of temporal pooling operations on the perceptual quality scores 190(1)-190(F) to compute the target perceptual quality score 198. For instance, in some embodiments, the score pooling engine 192 sets the target perceptual quality score 198 equal to the arithmetic mean of the perceptual quality scores 190(1)-190(F). Accordingly, the target perceptual quality score 198 represents an average perceptual video quality across the frames included in the reconstructed target video 174.

In some embodiments, the score pooling engine 192 performs any number and/or types of hysteresis pooling operations that mimic the relatively smooth variance of human opinion scores in response to changes in video quality. For instance, in some embodiments, the score pooling engine 192 could perform both linear low pass operations and non-linear (rank-order) weighting operations on the perceptual quality scores 190(1)-190(F) to compute the target perceptual quality score 198.

The quality inference application 170 can input any number of sets of feature values associated with any level of granularity into the perceptual quality model 178, and the techniques described herein are modified accordingly. For instance, in some embodiments, the quality inference application 170 inputs the feature value vectors 144(1)-144(F) into an instance of the feature pooling engine 150. In response, the feature pooling engine 150 outputs the aggregate feature value vector 152(0) (not shown). The quality inference application 170 then inputs the aggregate feature value vector 152(0) into the perceptual quality model 178. In response, the perceptual quality model 178 outputs the target perceptual quality score 198.

In some embodiments, any number of the techniques described herein can be used to determine which encoded version of the target video 172 to stream to a playback device. For instance, in some embodiments, a software application uses the quality inference application 170 to compute the target perceptual quality scores 198 for multiple reconstructed target videos 174 derived from different encoded versions of the target video 172. Based on the target perceptual quality scores 198, the software application selects one of the encoded versions of the target video 172. The software application then streams at least one of the encoded frames of the selected encoded version of the target video 172 to the playback device.

In the same or other embodiments, any number of the techniques described herein can be used to more accurately set both the degree of brightness compression and the degrees of color compression implemented by an encoder (e.g., the decoupled encoder 126) to achieve a given perceptual video quality level. For instance, in some embodiments, a software application uses the quality inference application 170 to compute the target perceptual quality scores 198 for multiple reconstructed target videos 174 derived from different encoded versions of the target video 172. The software application performs any number and/or types of optimization operations based on the target perceptual quality scores 198 to select values for the brightness QP and the color QPs. The software application then configures the decoupled encoder 126 to encode the target video 172 based on the selected values for the brightness QP and the color QPs.

Advantageously, in some embodiments, when the degree of brightness compression is relatively low, the encoder can reduce the degrees of color compression when encoding the target video 172 without necessarily reducing the target perceptual quality score 198 of the reconstructed target video 174 derived from the resulting encoded video. Therefore, the total number of bits used to encode the target video 172 can be reduced relative to the number of bits used to encode the target video 172 when a conventional perceptual quality model is used to set the degrees of compression.

Note that the techniques described herein are illustrative rather than restrictive and may be altered without departing from the broader spirit and scope of the invention. Many modifications and variations on the functionality provided by the training application 130, the feature engine 140, the feature pooling engine 150, the training engine 160, the perceptual quality model 178, the quality inference application 170, and the score pooling engine 192 will be apparent to those of ordinary skill in the art without departing from the scope and spirit of the described embodiments.

In particular, for explanatory purposes only, the training videos 122, the reconstructed training videos 124, the target video 172, and the reconstructed target video 174 are described as being represented in a YCbCr color space. In a complementary fashion, the functionality provided by the training application 130, the feature engine 140, the feature pooling engine 150, the training engine 160, the perceptual quality model 178, and the quality inference application 170 are described in the context of the YCbCr color space. In some other embodiments, video content (including reconstructed video content) can be represented in any other color space that includes, without limitation, at least one brightness component and at least one color component. In such embodiments, the functionality provided by the training application 130, the feature engine 140, the feature pooling engine 150, the training engine 160, the perceptual quality model 178, and the quality inference application 170 are modified accordingly.

For instance, in some embodiments, the training videos 122, the reconstructed training videos 124, the target video 172, and the reconstructed target video 174 are represented in a YUV color space via a Y component, a U component, and a V component. In such embodiments, the U and the V components represent the color information of the video content and are also referred to herein as the "color components" and the "chroma components." More precisely, the U component is the blue projection component, and the Y component is the red projection component. The functionality described herein is modified accordingly.

In some other embodiments, the training videos 122, the reconstructed training videos 124, the target video 172, and the reconstructed target video 174 are represented in a YIQ color space via a Y component, an I component, and a Q component. In such embodiments, the I and the Q components represent the color information of the video content and are also referred to herein as the "color components" and the "chroma components." More precisely, the I component is the in-phase component, and the Q component is the quadrature component. The functionality described herein is modified accordingly.

It will be appreciated that the system 100 shown herein is illustrative and that variations and modifications are possible. For instance, in some embodiments, the training application 130 can apply any number and/or types of machine learning algorithms to any training data at any level of granularity to generate a trained machine learning model that implements any type of quality metric. Further, the connection topology between the various components in FIG. 1 may be modified as desired. For instance, in some embodiments, the training application 130 and the quality inference application 170 are consolidated into a single software application.

Computing Feature Values Based on Brightness and Color

Figure 2:
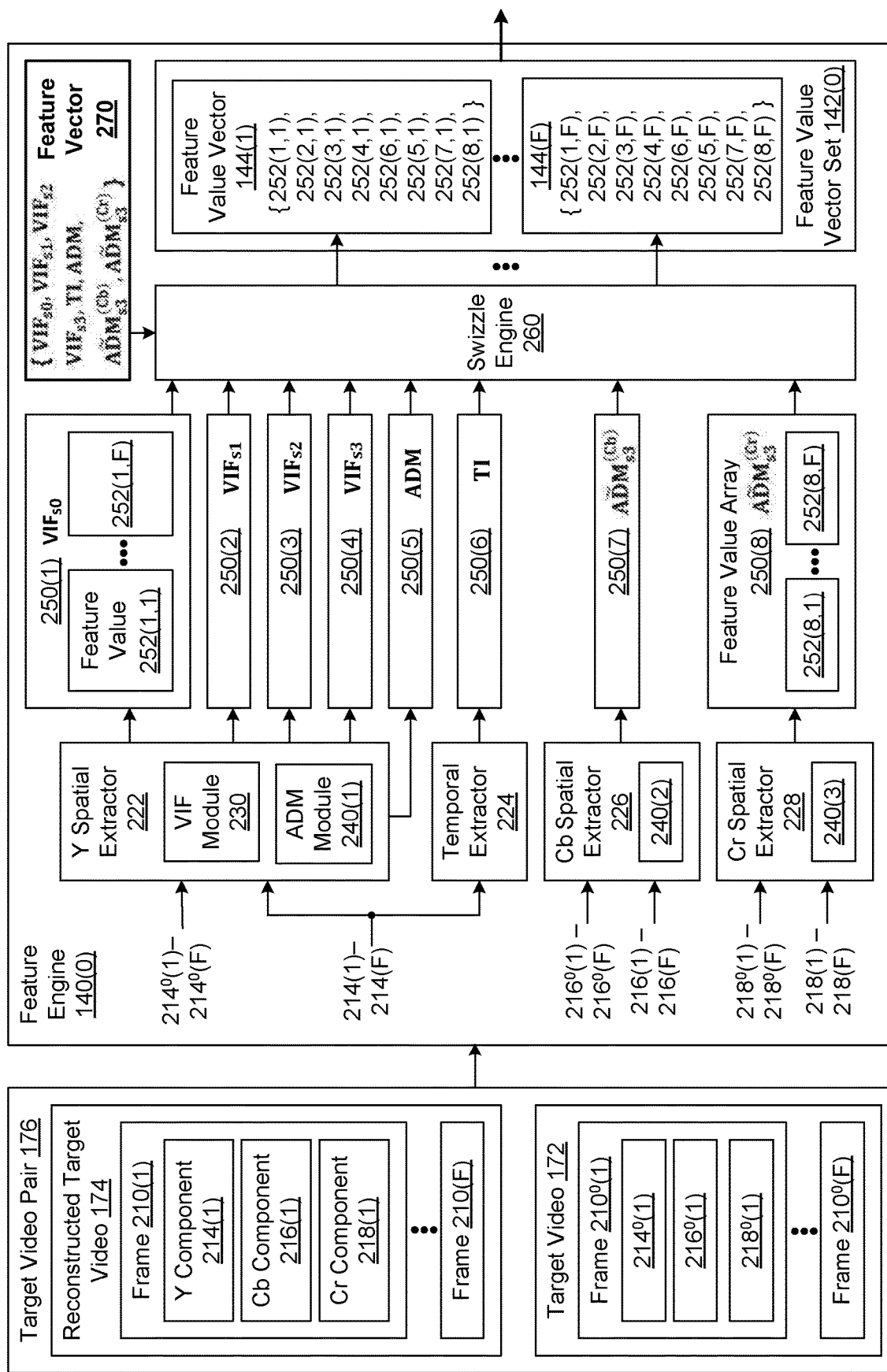
FIG. 2 is a more detailed illustration of the feature engine of FIG. 1, according to various embodiments.

FIG. 2 is a more detailed illustration of the feature engine 140 of FIG. 1, according to various embodiments. For explanatory purposes only, the functionality of the feature engine 140 is described in FIG. 2 in the context of the feature engine 140(0) of FIG. 1. The feature engine 140(0) computes the feature value vector set 142(0) based on the target video pair 176. Referring back now to FIG. 1, in some embodiments, the training application 130 inputs the training video pairs 132(1)-132(N) into any number of instances of the feature engine 140 that, in response, compute the feature value vector sets 140(1)-142(N) based on the techniques described below.

As shown, the target video pair 176 includes, without limitation, the target video 172 and the reconstructed target video 174. The reconstructed target video 174 is derived from the target video 172. For explanatory purposes, where needed, a superscript of 0 is appended to reference numbers of instances of objects that are included in the target video 172 to distinguish the instances of each object from instances of the same object that are included in the reconstructed target video 174.

As shown, the target video 172 includes, without limitation, frames $210^0(1)$-$210^0(F)$, where F can be any positive integer. The frames $210^0(1)$-$210^0(F)$ are also referred to herein collectively as "the frames $210^0$" and individually as "the frame $210^0$." Each of the frames $210^0$ can include, without limitation, any amount and type of video content, and the amount of video content can vary between the frames $210^0$.

As shown, the frame $210^0(1)$ includes, without limitation, the Y component $214^0(1)$, the Cb component $216^0(1)$, and the Cr component $218^0(1)$. Although not shown, the frame $210^0(y)$, where y is an integer from 2 to F includes, without limitation, the Y component $214^0(y)$, the Cb component $216^0(y)$, and the Cr component $218^0(y)$. The Y components $214^0(1)$-$214^0(F)$ also referred to herein collectively as "the Y components $214^0$" and individually as "the Y component $214^0$." The Cb components $216^0(1)$-$216^0(F)$ also referred to herein collectively as "the Cb components $216^0$" and individually as "the Cb component $216^0$." The Cr components $218^0(1)$-$214^0(F)$ also referred to herein collectively as "the Cr components $218^0$" and individually as "the Cr component $218^0$."

As shown, the reconstructed target video 174 includes, without limitation, frames 210(1)-210(F), where F can be any positive integer. The frames 210(1)-210(F) are also referred to herein collectively as "the frames 210" and individually as "the frame 210." Each of the frames 210 can include, without limitation, any amount and type of reconstructed video content, and the amount of reconstructed video content can vary between the frames 210.

As shown, the frame 210(1) includes, without limitation, the Y component 214(1), the Cb component 216(1), and the Cr component 218(1). Although not shown, the frame 210(y), where y is an integer from 2 to F includes, without limitation, the Y component 214(y), the Cb component 216(y), and the Cr component 218(y). The Y components 214(1)-214(F) are also referred to herein collectively as "the Y components 214" and individually as "the Y component 214." The Cb components 216(1)-216(F) also referred to herein collectively as "the Cb components 216" and individually as "the Cb component 216." The Cr components 218(1)-214(F) also referred to herein collectively as "the Cr components 218" and individually as "the Cr component 218."

As shown, in some embodiments, the feature engine 140(0) includes, without limitation, a feature vector 270, a Y spatial extractor 222, a temporal extractor 224, a Cb spatial extractor 226, a Cr spatial extractor 228, feature value arrays 250(1)-250(8), a swizzle engine 260, and the feature value vector set 142(0). In some embodiments, the feature vector 270 includes, without limitation, four Y spatial features associated with the Visual Information Fidelity ("VIF") quality metric, a temporal feature associated with a temporal information ("TI") quality metric, a Y spatial feature associated with the Additive Distortion Metric ("ADM"), a Cb spatial feature associated with the ADM, and a Cr spatial feature associated with the ADM.

The four spatial features associated with the VIF quality metric are designed to capture visual information fidelity loss in the Y components 214 at four different spatial scales and are denoted herein as $VIF_{s0}$, $VIF_{s1}$, $VIF_{s2}$, and $VIF_{s3}$. The temporal feature associated with the TI quality metric is designed to capture temporal distortions associated with and/or causing motion or changes that are quantified by differences in the Y components 214 between consecutive frames 210. The temporal feature is denoted herein as TI.

The Y spatial feature associated with the ADM is designed to capture loss of details and impairments that distract viewers in the Y components 214, The Cb and the Cr spatial feature associated with the ADM are designed to capture loss of details and impairments that distract viewers in the Cb components 216 and the Cr components 218, respectively, at a third scale associated with the ADM, The Y, Cb, and Cr spatial features associated with the ADM are denoted herein as ADM, $\tilde{ADM}_{s3}^{(Cb)}$, and $\tilde{ADM}_{s3}^{(Cr)}$, respectively.

Together, the Y spatial extractor 222, the temporal extractor 224, the Cb spatial extractor 226, and the Cr spatial extractor 228 generate the feature value arrays 250(1)-250(8). As shown, the feature value arrays 250(1)-250(8) are associated with the $VIF_{s0}$, the $VIF_{s1}$, the $VIF_{s2}$, the $VIF_{s3}$, the ADM, the TI, the $\tilde{ADM}_{s3}^{(Cb)}$, and the $\tilde{ADM}_{s3}^{(Cr)}$, respectively. The feature value array 250(1) includes, without limitation, feature values 252(1,1)-252(1,F) that specify the values of the $VIF_{s0}$ for the frames 210(1)-210(F), respectively. The feature value array 250(8) includes, without limitation, feature values 252(8,1)-252(8,F) that specify the values of the $\tilde{ADM}_{s3}^{(Cr)}$ for the frames 210(1)-210(F), respectively.

Although not shown, the feature value array 250(2) includes, without limitation, feature values 252(2,1)-252(2,F) that specify the values of the $VIF_{s1}$ for the frames 210(1)-210(F), respectively. The feature value array 250(3) includes, without limitation, feature values 252(3,1)-252(3,F) that specify the values of the $VIF_{s2}$ for the frames 210(1)-210(F), respectively. The feature value array 250(4) includes, without limitation, feature values 252(4,1)-252(4,F) that specify the values of the $VIF_{s3}$ for the frames 210(1)-210(F), respectively. The feature value array 250(5) includes, without limitation, feature values 252(5,1)-252(5,F) that specify the values of the ADM for the frames 210(1)-210(F), respectively. The feature value array 250(6) includes, without limitation, feature values 252(6,1)-252(6,F) that specify the values of the TI for the frames 210(1)-210(F), respectively. The feature value array 250(7) includes, without limitation, feature values 252(7,1)-252(7,F) that specify the values of the $\tilde{ADM}_{s3}^{(Cb)}$ for the frames 210(1)-210(F), respectively.

As shown, the Y spatial extractor 222 generates the feature value arrays 250(1)-250(5) based on the Y components $214^{0}$ and the Y components 214. The Y spatial extractor 222 includes, without limitation, a VIF module 230 and an ADM module 240(1). The VIF module 230 implements any number and/or type of algorithms associated with the VIF quality metric. For instance, in some embodiments, the VIF module 230 includes, without limitations, one or more algorithms that apply a wavelet transformation to analyze signals in the frequency domain.

The Y spatial extractor 222 uses the VIF module 230 to generate the feature value arrays 250(1)-250(4) based on four different spatial scales associated with the $VIF_{s0}$, the $VIF_{s1}$, the $VIF_{s2}$, and the $VIF_{s3}$, respectively, the Y components $214^{0}$ and the Y components 214, More precisely, for each of the frames 210(y) where y is an integer from 1 to F, the Y spatial extractor 222 uses the VIF module 230 to compute the feature values 252(1,y), 252(2,y), 252(3,y), and 252(4,y) for the $VIF_{s0}$, the $VIF_{s1}$, the $VIF_{s2}$, and the $VIF_{s3}$, respectively, based on the Y component $214^{0}$(y) and the Y component 214(y).

The ADM module 240(1) is an instance of a software application referred to herein as "the ADM module 240." The ADM module 240 includes, without limitation, any number of blocks of perceptual quality models that, together, implement an image quality assessment algorithm. The Y spatial extractor 222 uses the ADM module 240(1) to generate the feature value array 250(5) based the Y components $214^{0}$ and the Y components 214, In some embodiments, for each of the frames 210(y) where y is an integer from 1 to F, the Y spatial extractor inputs the Y component $214^{0}$(y) and the Y component 214(y) into the ADM module 240(1). In response, the ADM module 240(1) outputs, without limitation, the feature value 252(5,y) and any number (including none) of additional values that the Y spatial extractor 222 disregards.

As shown, the temporal extractor 224 generates the feature value array 250(6) based on the Y components 214. The temporal extractor 224 can generate the feature values 252(6,1)-252(6,F) in any technically feasible fashion. In some embodiments, for each of the frames 210(1)-210(F), the temporal extractor 224 generates a different frame pair (not shown) based on the Y components 214(1)-241(F). Each of the frame pairs includes, without limitation, the Y component 214 of the associated frame 210 and the Y component 214 of one of the frames 210 that is temporally adjacent to the associated frame 210. For instance, in some embodiments, the frame pair associated with the frame 210(1) includes, without limitation, the Y component 214(1) and the Y component 214(2). For each of the frame pairs, the temporal extractor 224 computes per-pixel differences between the associated Y components 214. For each of the frames 210(y) where y is an integer from 1 to F, the temporal extractor 224 sets the feature value 252(6,y) equal to average of the per-pixel differences for the associated frame pair.

As shown, the Cb spatial extractor 226 generates the feature value array 250(7) based on the Cb components $216^{0}$ and the Cb components 216. The Cb spatial extractor 226 includes, without limitation, an ADM module 240(2). The ADM module 240(2) is an instance of the ADM module 240 described previously herein in conjunction with the Y spatial extractor 222. In some embodiments, for each of the frames 210(y) where y is an integer from 1 to F, the Cb spatial extractor 226 inputs the Cb component $216^{0}$(y) and the Cb component 216(y) into the ADM module 240(2). In response, the ADM module 240(2) outputs, without limitation, the feature value 252(7,y) for the third scale associated with the ADM and any number (including none) of other values that the Cb spatial extractor 226 disregards.

As shown, the Cr spatial extractor 228 generates the feature value array 250(8) based on the Cr components $218^{0}$ and the Cr components 218. The Cr spatial extractor 228 includes, without limitation, an ADM module 240(3). The ADM module 240(3) is an instance of the ADM module 240 described previously herein in conjunction with the Y spatial extractor 222. In some embodiments, for each of the frames 210(y) where y is an integer from 1 to F, the Cr spatial extractor 228 inputs the Cr component $218^{0}$(y) and the Cr component 218(y) into the ADM module 240(3). In response, the ADM module 240(3) outputs, without limitation, the feature value 252(8,y) for the third scale associated with the ADM and any number (including none) of other values that the Cr spatial extractor 228 disregards.

The swizzle engine 260 generates the feature value vector set 142(0) based on the feature value arrays 250(1)-250(8). In some embodiments, the swizzle engine 260 sets the feature value vector set 142(0) equal to the empty set. For the frame 210(y), where y is an integer between 1 and F, the swizzle engine 260 arranges the feature values 252(1,y), 252(2,y), 252(3,y), 252(4,y), 252(5,y), 252(6,y), 252(7,y), and 252(8,y) in the order specified in the feature vector 270 to generate the feature value vector 144(y). For instance, in some embodiments, the feature vector 270 is denoted as {$VIF_{s0}$, $VIF_{s1}$, $VIF_{s2}$, $VIF_{s3}$, TI, ADM, $V\tilde{ADM}_{s3}^{(Cb)}$, $\tilde{ADM}_{s3}^{(Cr)}$}.

As shown, based on the ordering of the features within the feature vector 270, the swizzle engine 260 generates the feature value vector 144(1) that includes, sequentially and without limitation, the feature values 252(1,1), 252(2,1), 252(3,1), 252(4,1), 252(6,1), 252(5,1), 252(7,1), and 252(8, 1). Similarly, the swizzle engine 260 generates the feature value vector 144(F) that includes, sequentially and without limitation, the feature values 252(1,F), 252(2,F), 252(3, F), 252(4, F), 252(6, F), 252(5, F), 252(7,F), and 252(8,F). Although not shown, the swizzle engine 260 generates the feature value vector 144(y), for y is an integer from 2 to (F−1), that includes, sequentially, and without limitation, the feature values 252(1,y), 252(2,y), 252(3,y), 252(4,y), 252 (6,y), 252(5,y), 252(7,y), and 252(8,y). The swizzle engine 260 adds the feature value vectors 144(1)-144(F) to the feature value vector set 142(0). The feature engine 140(0) then outputs the feature value vector set 142(0).

Figure 3:
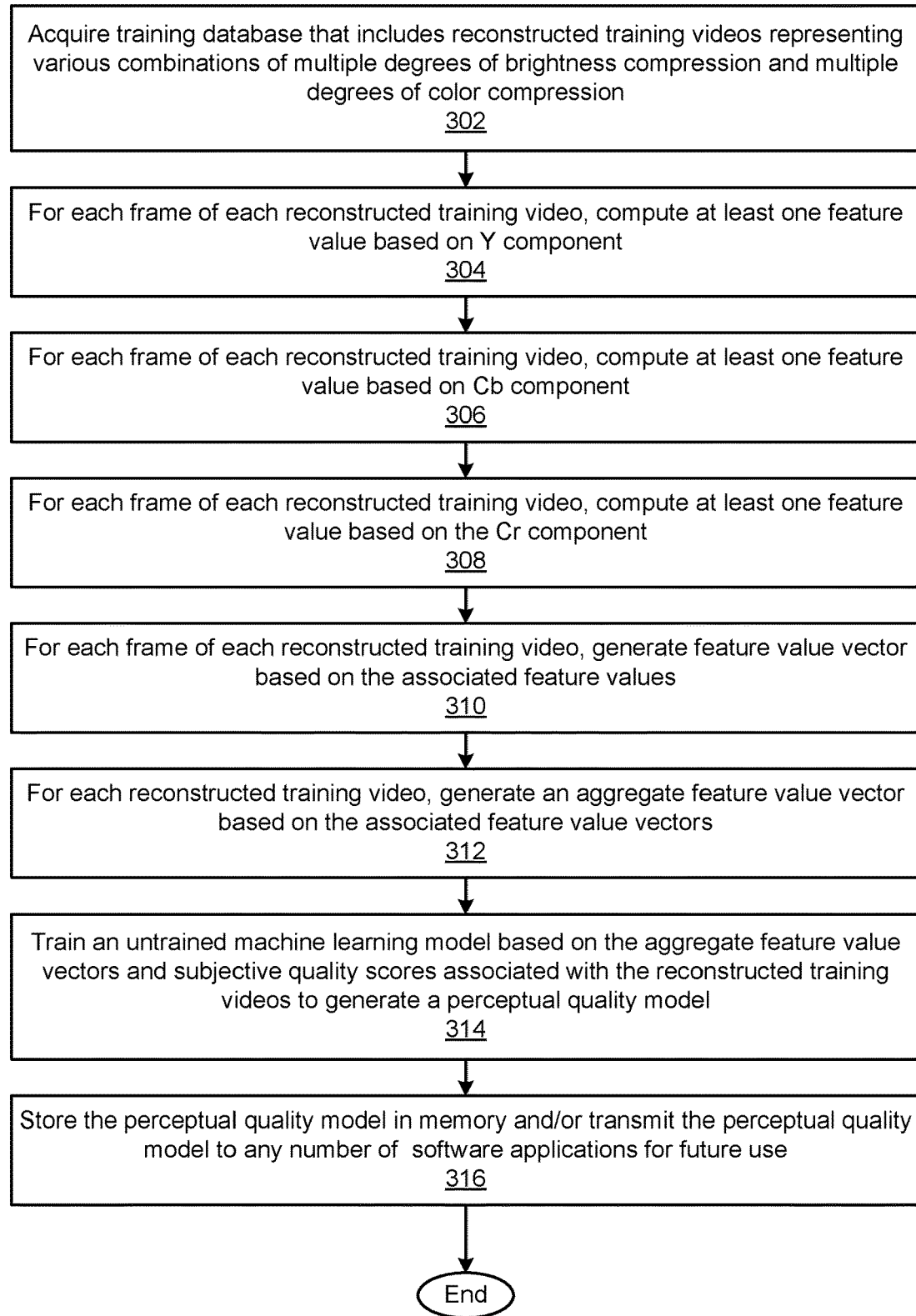
FIG. 3 is a flow diagram of method steps for generating a perceptual quality model that accounts for brightness and color distortions in reconstructed videos, according to various embodiments.

FIG. 3 is a flow diagram of method steps for generating a perceptual quality model that accounts for brightness and color distortions in reconstructed videos, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the training application 130 acquires the training database 120 that includes, without limitation, the reconstructed training video 124(1)-124(N) representing various combinations of multiple degrees of brightness compression and multiple degrees of color compression. At step 304, for each of the frames 210 of each of the reconstructed training videos 124, the Y spatial extractor 222 computes one or more of the feature values 252 based on the Y component 214 and the Y component 214°. In some embodiments, as part of step 304, the temporal extractor 224 computes one or more of the feature values 252 based on the Y component 214.

At step 306, for each of the frames 210 of each of the reconstructed training videos 124, the Cb spatial extractor 226 computes one or more of the feature values 252 based on the Cb component 216 and the Cb component 216°. At step 308, for each of the frames 210 of each of the reconstructed training videos 124, the Cr spatial extractor 228 computes one or more of the feature values 252 based on the Cr component 218 and the Cr component 218°.

At step 310, for each of the frames 210 of each of the reconstructed training videos 124, the feature engine 140 generates the feature value vector 144 associated with the frame 210 based on the feature values 252 associated with the frame 210. At step 312, for each of the reconstructed training videos 124, the feature pooling engine 150 computes the aggregate feature value vector 152 associated with the reconstructed training video 124 based on the feature value vectors 144 associated with the reconstructed training video 124.

At step 314, the training engine 160 trains an untrained machine learning model based on the aggregate feature value vectors 152(1)-152(N) and the subjective quality scores 104(1)-104(N) to generate the perceptual quality model 178. At step 316, the training engine 160 stores the perceptual quality model 178 in memory and/or transmits the perceptual quality model 178 to any number of software applications (e.g., the quality inference application 170) for future use. The method 300 then terminates.

Figure 4:
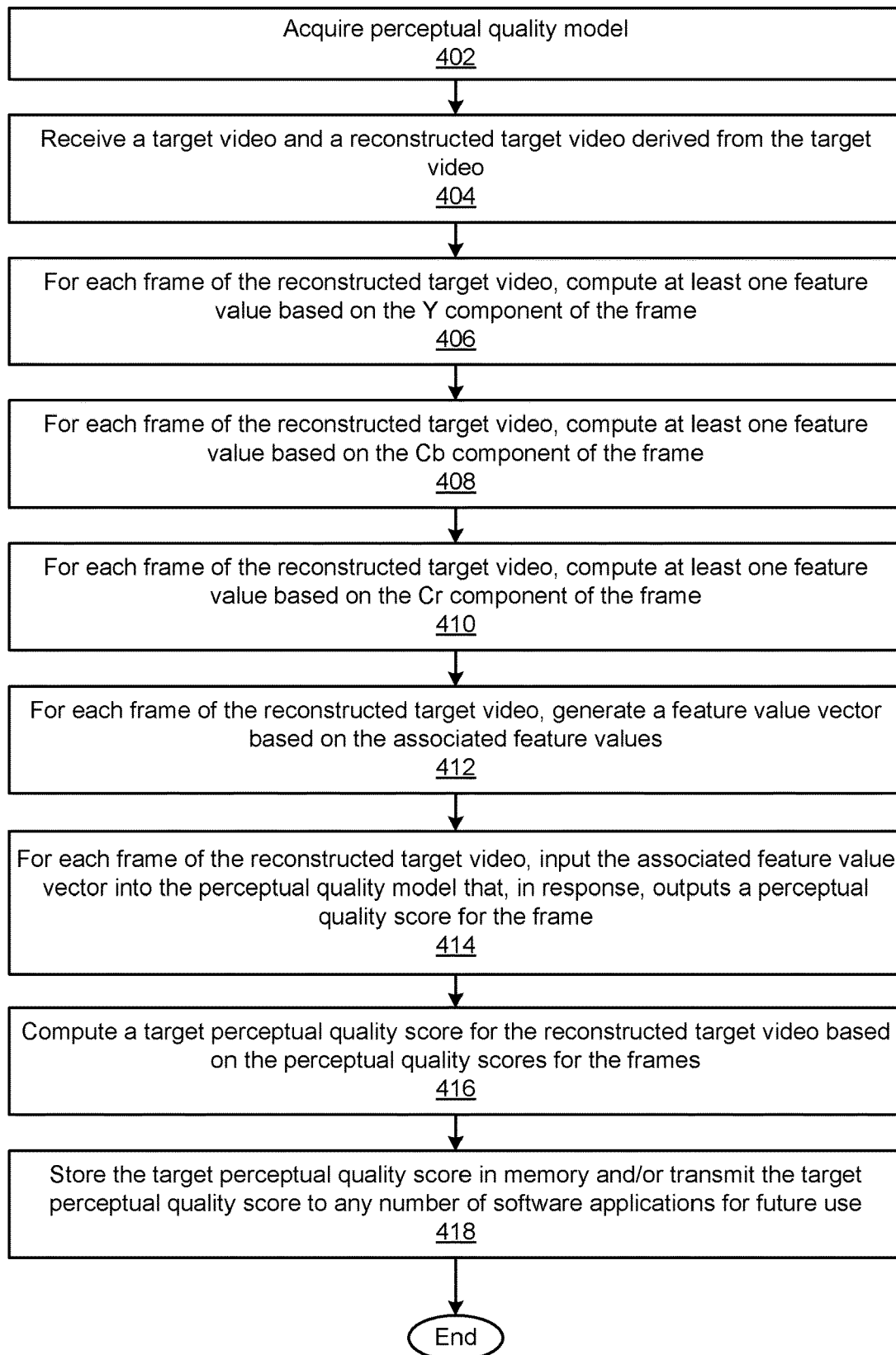
FIG. 4 is a flow diagram of method steps for estimating perceptual video quality based on brightness components and color components, according to various embodiments.

FIG. 4 is a flow diagram of method steps for estimating perceptual video quality based on brightness components and color components, according to various embodiments. Although the method steps are described with reference to the systems of FIGS. 1-2, persons skilled in the art will understand that any system configured to implement the method steps, in any order, falls within the scope of the embodiments.

As shown, a method 400 begins at step 402, where the quality inference application 170 acquires the perceptual quality model 178. At step 404, the quality inference application 170 receives the target video 172 and the reconstructed target video 174 derived from the target video. At step 406, for each of the frames 210 of the reconstructed target video 174, the Y spatial extractor 222 computes one or more of the feature values 252 based on the Y component 214 and the Y component 214°. In some embodiments, as part of step 406, the temporal extractor 224 computes one or more of the feature values 252 based on the Y component 214.

At step 408, for each of the frames 210 of the reconstructed target video 174, the Cb spatial extractor 226 computes one or more of the feature values 252 based on the Cb component 216 and the Cb component 216°. At step 410, for each of the frames 210 of the reconstructed target video 174, the Cr spatial extractor 228 computes one or more of the feature values 252 based on the Cr component 218 and the Cr component 218°.

At step 412, for each of the frames 210 of the reconstructed target video 174, the feature engine 140 generates the feature value vector 144 associated with the frame 210 based on the feature values 252 associated with the frame 210. At step 414, for each of the frames 210 of the reconstructed target video 174, the quality inference application 170 inputs the feature value vector 144 associated with the frame 210 into the perceptual quality model 178 that, in response, outputs the perceptual quality score 190 for the frame 210. At step 416, the score pooling engine 192 computes the target perceptual quality score 198 for the reconstructed target video 174 based on the perceptual quality scores 190 for the frames 210 of the reconstructed target video 174.

At step 418, the quality inference application 170 stores the target perceptual quality score 198 in memory and/or transmits the target perceptual quality score 198 to any number of software applications for future use. For instance, in some embodiments, a software application performs optimization operations based on the target perceptual quality score 198 to determine one or more encoding parameters used to re-encode the target video 172 for streaming to one or more playback devices. The method 400 then terminates.

In sum, the disclosed techniques can be used to efficiently and reliably estimate the perceptual video quality of reconstructed videos derived from encoded videos associated with arbitrary degrees of color compression and brightness compression. In some embodiments, a training application generates a perceptual quality model based on a training database and a subjective dataset. The training database includes, without limitation, training videos, and reconstructed training videos. Notably, some of the reconstructed training videos include distortions resulting from similar degrees of color compression and brightness compression, while the remainder of the reconstructed training videos include distortions resulting from degrees of color compression that differ from the degree of brightness compression. The subjective dataset reflects individual quality scores assigned during a subjective quality experiment and includes, without limitation, a subjective quality score for each of the reconstructed training videos.

The training application includes, without limitation, a feature engine, a feature pooling engine, and a training engine. For each of the frames of each of the reconstructed training videos, the feature engine generates a different feature value vector based on the Y, Cb, and Cr components of the frame and the Y, Cb, and Cr components of the corresponding frame of the corresponding training video. Each feature value vector includes, without limitation, a different feature value for each of any number of features included in a feature vector. The feature vector includes, without limitation, at least one feature that captures aspects of brightness distortions and at least one feature that captures aspects of color distortions.

In some embodiments, the feature vector includes, without limitation, $VIF_{s1}$, $VIF_{s2}$, $VIF_{s3}$, ADM, TI, $\tilde{ADM}_{s3}^{(Cb)}$ and $\tilde{ADM}_{s3}^{(Cr)}$. The feature engine computes the feature values for the $VIF_{s1}$, the $VIF_{s2}$, the $VIF_{s3}$, and the ADM based on the Y components of the reconstructed training videos and the Y components of the training videos. The feature engine computes the feature values for the TI based on the Y components of the reconstructed training videos. The feature engine computes the feature values for the $\tilde{ADM}_{s3}^{(Cb)}$ based on the Cb components of the reconstructed training videos and the Cb components of the training videos. The feature engine computes the feature values for the $\tilde{ADM}_{s3}^{(Cr)}$ based on the Cr components of the reconstructed training videos and the Cr components of the training videos For each reconstructed training video, the feature pooling engine computes a single aggregate feature value vector specifying a different feature value for each of the features included in the feature vector based on the feature value vectors associated with the frames included in the reconstructed training video. The training engine applies one or more machine learning algorithms to the aggregate feature value vectors and the subjective quality scores to generate the perceptual quality model. The perceptual quality model maps a feature value vector for reconstructed video content at any level of granularity to a perceptual quality score that estimates the perceptual video quality of the reconstructed video content.

In some embodiments, a quality inference application uses the perceptual quality model to compute a perceptual quality score for a reconstructed target video. The quality inference application includes, without limitation, the feature engine, the perceptual quality model, and a score pooling engine. The feature engine generates a different feature value vector for each frame of the reconstructed target video based on the Y, Cb, and Cr components of the reconstructed target video and an associated target video. For each frame of the reconstructed target video, the quality inference application inputs the associated feature value vector into the perceptual quality model and, in response, the perceptual quality model outputs the perceptual quality score for the frame. The score pooling engine computes a target perceptual quality score that estimates the perceptual video quality of the reconstructed target video based on the perceptual quality scores for the frames of the reconstructed target video.

At least one technical advantage of the disclosed techniques relative to the prior art is that the perceptual quality model can be used to more accurately estimate perceptual video quality levels for reconstructed videos having both brightness distortions and color distortions. In that regard, the feature value vector sets capture visual quality-related aspects of diverse ranges and combinations of color distortions as well as brightness distortions. As a result, the perceptual quality model learns to accurately account for the composite impact of color distortions and brightness distortions on visual quality, as perceived by actual human viewers of reconstructed videos. In a complementary fashion, the quality inference application can be used to accurately measure tradeoffs between bitrate and perceptual visual quality during encoding and/or video streaming corresponding to different degrees of color compression and brightness compression. Relative to prior art techniques, the tradeoff measurements can be used to reduce the number of bits used to encode a given video to achieve a target perceptual video quality level. These technical advantages provide one or more technological improvements over prior art approaches.

1. In some embodiments, a computer-implemented method for estimating the perceived quality of reconstructed videos comprises computing a first feature value for a first feature included in a feature vector based on a first color component associated with a first reconstructed video, computing a second feature value for a second feature included in the feature vector based on a first brightness component associated with the first reconstructed video, and computing a first perceptual quality score based on the first feature value and the second feature value, wherein the first perceptual quality score indicates a level of visual quality associated with at least one frame included in the first reconstructed video.

2. The computer-implemented method of clause 1, wherein the first color component comprises a blue-difference component or a red-difference component.

3. The computer-implemented method of clauses 1 or 2, wherein computing the first perceptual quality score comprises generating a first feature value vector based on the first feature value and the second feature value, and inputting the first feature value vector into a trained machine learning model that, in response, outputs the first perceptual quality score.

4. The computer-implemented method of any of clauses 1-3, wherein generating the first feature value vector comprises computing a third feature value for a third feature included in the feature vector based on a second color component associated with the first reconstructed video, and aggregating at least the first feature value, the second feature value, and the third feature value to generate the first feature value vector.

5. The computer-implemented method of any of clauses 1-4, wherein the first reconstructed video is derived from a first encoded version of a first video, and computing the first feature value comprises applying an algorithm associated with a visual quality metric to the first color component and a third color component associated with the first video.

6. The computer-implemented method of any of clauses 1-5, wherein the second feature value quantifies an aspect of visual quality associated with a temporal distortion in the first brightness component.

7. The computer-implemented method of any of clauses 1-6, wherein the first perceptual quality score is associated with a first frame included in the first reconstructed video, and further comprising computing an overall perceptual quality score that indicates an overall level of visual quality associated with the first reconstructed video based on the first perceptual quality score and at least a second perceptual quality score associated with a second frame included in the first reconstructed video.

8. The computer-implemented method of any of clauses 1-7, wherein the first reconstructed video is derived from a first encoded version of a first video, a second reconstructed video is derived from a second encoded version of the first video, and further comprising computing a second perceptual quality score based on a second color component and a second brightness component that are both associated with the second reconstructed video, and determining to stream a first frame of the first encoded video instead of a second frame of the second encoded video to a playback device based on the first perceptual quality score and the second perceptual quality score.

9. The computer-implemented method of any of clauses 1-8, wherein the first encoded version of the first video is associated with a first degree of color compression, and the second encoded version of the first video is associated with a second degree of color compression that is less than the first degree of color compression.

10. The computer-implemented method of any of clauses 1-9, wherein the first reconstructed video is derived from a first encoded version of a first video, and further comprising performing one or more operations based on the first perceptual quality score and a second perceptual quality score associated with a second encoded version of the first video to determine a first value for a color quantization parameter and a second value for a brightness quantization parameter, and encoding the first video based on the first value for the color quantization parameter and the second value for the brightness quantization parameter to generate a third encoded version of the first video, wherein the third encoded version of the first video is subsequently streamed to at least one playback device.

11. In some embodiments, one or more non-transitory computer readable media include instructions that, when executed by one or more processors, cause the one or more processors to estimate the perceived quality of reconstructed videos by performing the steps of computing a feature value vector for a feature vector based on a first color component and a first brightness component that are both associated with a first reconstructed video, and computing a first perceptual quality score based on the feature value vector, wherein the first perceptual quality score indicates a level of visual quality associated with at least one frame included in the first reconstructed video.

12. The one or more non-transitory computer readable media of clause 11, wherein the first color component comprises a blue-difference component or a red-difference component.

13. The one or more non-transitory computer readable media of clauses 11 or 12, wherein computing the first perceptual quality score comprises inputting the feature value vector into a trained machine learning model that, in response, outputs the first perceptual quality score.

14. The one or more non-transitory computer readable media of any of clauses 11-13, wherein generating the feature value vector comprises computing a first feature value for a first feature included in the feature vector based on the first color component, computing a second feature value for a second feature included in the feature vector based on the first brightness component, computing a third feature value for a third feature included in the feature vector based on a second color component associated with the first reconstructed video, and aggregating at least the first feature value, the second feature value, and the third feature value to generate the feature value vector.

15. The one or more non-transitory computer readable media of any of clauses 11-14, wherein a first feature value included in the feature value vector quantifies an aspect of visual quality associated with a spatial artifact in the first color component.

16. The one or more non-transitory computer readable media of any of clauses 11-15, wherein a first feature value included in the feature value vector quantifies an aspect of visual quality associated with a temporal distortion in the first brightness component.

17. The one or more non-transitory computer readable media of any of clauses 11-16, further comprising performing one or more temporal pooling operations on a plurality of perceptual quality scores that includes the first perceptual quality score and is associated with a plurality of frames included in the first reconstructed video to determine an overall perceptual quality score that indicates an overall level of visual quality associated with the first reconstructed video.

18. The one or more non-transitory computer readable media of any of clauses 11-17, wherein the first reconstructed video is derived from a first encoded version of a first video, a second reconstructed video is derived from a second encoded version of the first video, and further comprising computing a second perceptual quality score based on a second color component and a second brightness component that are both associated with the second reconstructed video, and determining to stream a first frame of the first encoded video instead of a second frame of the second encoded video to a playback device based on the first perceptual quality score and the second perceptual quality score.

19. The one or more non-transitory computer readable media of any of clauses 11-18, wherein the first reconstructed video is derived from a first encoded video that is associated with both a first degree of color compression and a second degree of brightness compression.

20. In some embodiments, a system comprises one or more memories storing instructions and one or more processors coupled to the one or more memories that, when executing the instructions, perform the steps of computing at least a first feature value for at least a first feature included in a feature vector based on a first color component associated with a first reconstructed video, computing at least a second feature value for at least a second feature included in the feature vector based on a first brightness component associated with the first reconstructed video, and inputting the at least the first feature value and the at least the second feature value into a trained machine learning model that, in response, outputs a first perceptual quality score that indicates a level of visual quality associated with at least one frame included in the first reconstructed video.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable media having computer readable program codec embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory (EPROM or Flash memory), an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for estimating the perceived quality of reconstructed videos, the method comprising:
    computing a first feature value for a first feature included in a feature vector based on a first color component associated with a first reconstructed video and a second color component associated with a first video from which the first reconstructed video is derived;
    computing a second feature value for a second feature included in the feature vector based on a first brightness component associated with the first reconstructed video; and
    computing a first perceptual quality score based on the first feature value and the second feature value, wherein the first perceptual quality score indicates a level of visual quality associated with at least one frame included in the first reconstructed video.

2. The computer-implemented method of claim 1, wherein the first color component comprises a blue-difference component or a red-difference component.

3. The computer-implemented method of claim 1, wherein computing the first perceptual quality score comprises:
    generating a first feature value vector based on the first feature value and the second feature value; and
    inputting the first feature value vector into a trained machine learning model that, in response, outputs the first perceptual quality score.

4. The computer-implemented method of claim 3, wherein generating the first feature value vector comprises:
    computing a third feature value for a third feature included in the feature vector based on a third color component associated with the first reconstructed video; and
    aggregating at least the first feature value, the second feature value, and the third feature value to generate the first feature value vector.

5. The computer-implemented method of claim 1, wherein the first reconstructed video is derived from a first encoded version of the first video, and computing the first feature value comprises applying an algorithm associated with a visual quality metric to the first color component and the second color component.

6. The computer-implemented method of claim 1, wherein the second feature value quantifies an aspect of visual quality associated with a temporal distortion in the first brightness component.

7. The computer-implemented method of claim 1, wherein the first perceptual quality score is associated with a first frame included in the first reconstructed video, and further comprising computing an overall perceptual quality score that indicates an overall level of visual quality associated with the first reconstructed video based on the first perceptual quality score and at least a second perceptual quality score associated with a second frame included in the first reconstructed video.

8. The computer-implemented method of claim 1, wherein the first reconstructed video is derived from a first encoded version of the first video, a second reconstructed video is derived from a second encoded version of the first video, and further comprising:
    computing a second perceptual quality score based on a third color component and a second brightness component that are both associated with the second reconstructed video; and determining to stream a first frame of the first encoded video instead of a second frame of the second encoded video to a playback device based on the first perceptual quality score and the second perceptual quality score.

9. The computer-implemented method of claim 8, wherein the first encoded version of the first video is associated with a first degree of color compression, and the second encoded version of the first video is associated with a second degree of color compression that is less than the first degree of color compression.

10. The computer-implemented method of claim 1, wherein the first reconstructed video is derived from a first encoded version of the first video, and further comprising:
performing one or more operations based on the first perceptual quality score and a second perceptual quality score associated with a second encoded version of the first video to determine a first value for a color quantization parameter and a second value for a brightness quantization parameter; and
encoding the first video based on the first value for the color quantization parameter and the second value for the brightness quantization parameter to generate a third encoded version of the first video, wherein the third encoded version of the first video is subsequently streamed to at least one playback device.

11. One or more non-transitory computer readable media including instructions that, when executed by one or more processors, cause the one or more processors to estimate the perceived quality of reconstructed videos by performing the steps of:
computing a feature value vector for a feature vector based on a first color component and a first brightness component that are both associated with a first reconstructed video and a second color component that is associated with a first video from which the first reconstructed video is derived; and
computing a first perceptual quality score based on the feature value vector, wherein the first perceptual quality score indicates a level of visual quality associated with at least one frame included in the first reconstructed video.

12. The one or more non-transitory computer readable media of claim 11, wherein the first color component comprises a blue-difference component or a red-difference component.

13. The one or more non-transitory computer readable media of claim 11, wherein computing the first perceptual quality score comprises inputting the feature value vector into a trained machine learning model that, in response, outputs the first perceptual quality score.

14. The one or more non-transitory computer readable media of claim 11, wherein generating the feature value vector comprises:
computing a first feature value for a first feature included in the feature vector based on the first color component and the second color component;
computing a second feature value for a second feature included in the feature vector based on the first brightness component;
computing a third feature value for a third feature included in the feature vector based on a third color component associated with the first reconstructed video; and
aggregating at least the first feature value, the second feature value, and the third feature value to generate the feature value vector.

15. The one or more non-transitory computer readable media of claim 11, wherein a first feature value included in the feature value vector quantifies an aspect of visual quality associated with a spatial artifact in the first color component.

16. The one or more non-transitory computer readable media of claim 11, wherein a first feature value included in the feature value vector quantifies an aspect of visual quality associated with a temporal distortion in the first brightness component.

17. The one or more non-transitory computer readable media of claim 11, further comprising performing one or more temporal pooling operations on a plurality of perceptual quality scores that includes the first perceptual quality score and is associated with a plurality of frames included in the first reconstructed video to determine an overall perceptual quality score that indicates an overall level of visual quality associated with the first reconstructed video.

18. The one or more non-transitory computer readable media of claim 11, wherein the first reconstructed video is derived from a first encoded version of the first video, a second reconstructed video is derived from a second encoded version of the first video, and further comprising:
computing a second perceptual quality score based on a fourth color component and a second brightness component that are both associated with the second reconstructed video; and
determining to stream a first frame of the first encoded video instead of a second frame of the second encoded video to a playback device based on the first perceptual quality score and the second perceptual quality score.

19. The one or more non-transitory computer readable media of claim 11, wherein the first reconstructed video is derived from a first encoded video that is associated with both a first degree of color compression and a second degree of brightness compression.

20. A system comprising:
one or more memories storing instructions; and
one or more processors coupled to the one or more memories that, when executing the instructions, perform the steps of:
computing at least a first feature value for at least a first feature included in a feature vector based on a first color component associated with a first reconstructed video and a second color component associated with a first video from which the first reconstructed video is derived;
computing at least a second feature value for at least a second feature included in the feature vector based on a first brightness component associated with the first reconstructed video; and
inputting the at least the first feature value and the at least the second feature value into a trained machine learning model that, in response, outputs a first perceptual quality score that indicates a level of visual quality associated with at least one frame included in the first reconstructed video.

* * * * *